United States Patent
Rao et al.

(10) Patent No.: US 11,862,159 B2
(45) Date of Patent: *Jan. 2, 2024

(54) COMMUNICATION WITH USER PRESENCE

(71) Applicant: Amazon Technologies, Inc., Seattle, WA (US)

(72) Inventors: Shambhavi Sathyanarayana Rao, Seattle, WA (US); Anna Chen Santos, Mountain View, CA (US); Tony Roy Hardie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/464,754

(22) Filed: Sep. 2, 2021

(65) Prior Publication Data

US 2022/0059090 A1  Feb. 24, 2022

Related U.S. Application Data

(63) Continuation of application No. 16/141,172, filed on Sep. 25, 2018, now Pat. No. 11,145,301.

(51) Int. Cl.
*G10L 15/22* (2006.01)
*G10L 15/18* (2013.01)
*G06F 40/30* (2020.01)
*G10L 15/08* (2006.01)

(52) U.S. Cl.
CPC ............ *G10L 15/22* (2013.01); *G06F 40/30* (2020.01); *G10L 15/1815* (2013.01); *G10L 2015/088* (2013.01); *G10L 2015/223* (2013.01)

(58) Field of Classification Search
CPC ....... G10L 15/22; G10L 5/1815; G10L 15/18; G10L 2015/088; G10L 15/08; G10L 2015/223; G10L 15/00; G06F 40/30; G06F 3/167; G06F 3/16; H04L 41/16; H04Q 3/64; H04M 3/38; H04M 2201/40; H04M 2203/2094; H04M 2203/6045; H04M 2250/12; H04M 2250/10; H04M 2250/52; H04M 1/0264; H04M 3/42374; H04M 3/42

See application file for complete search history.

(56) References Cited

U.S. PATENT DOCUMENTS

| | | | |
|---|---|---|---|
| 2014/0244269 A1* | 8/2014 | Tokutake | G10L 15/00 704/275 |
| 2016/0191434 A1* | 6/2016 | Rice | H04L 51/10 709/204 |
| 2018/0070208 A1* | 3/2018 | Alharayeri | H04W 4/08 |
| 2019/0214010 A1* | 7/2019 | Ma | G06F 3/167 |

* cited by examiner

*Primary Examiner* — Huyen X Vo
(74) *Attorney, Agent, or Firm* — Pierce Atwood LLP

(57) ABSTRACT

A system and method establishes a communication connection between a first device of a first user and a second device of a second user. Request data corresponding to a request to establish a communication connection with a second user is received, and a user profile associated with the second user is determined. One or more sensors of the second device receive input data corresponding to the environment of the second device, and an identity of the second user is determined based thereon. The communication connection is established and, based on the identity, the second device tracks movement of the second user in the environment.

20 Claims, 20 Drawing Sheets

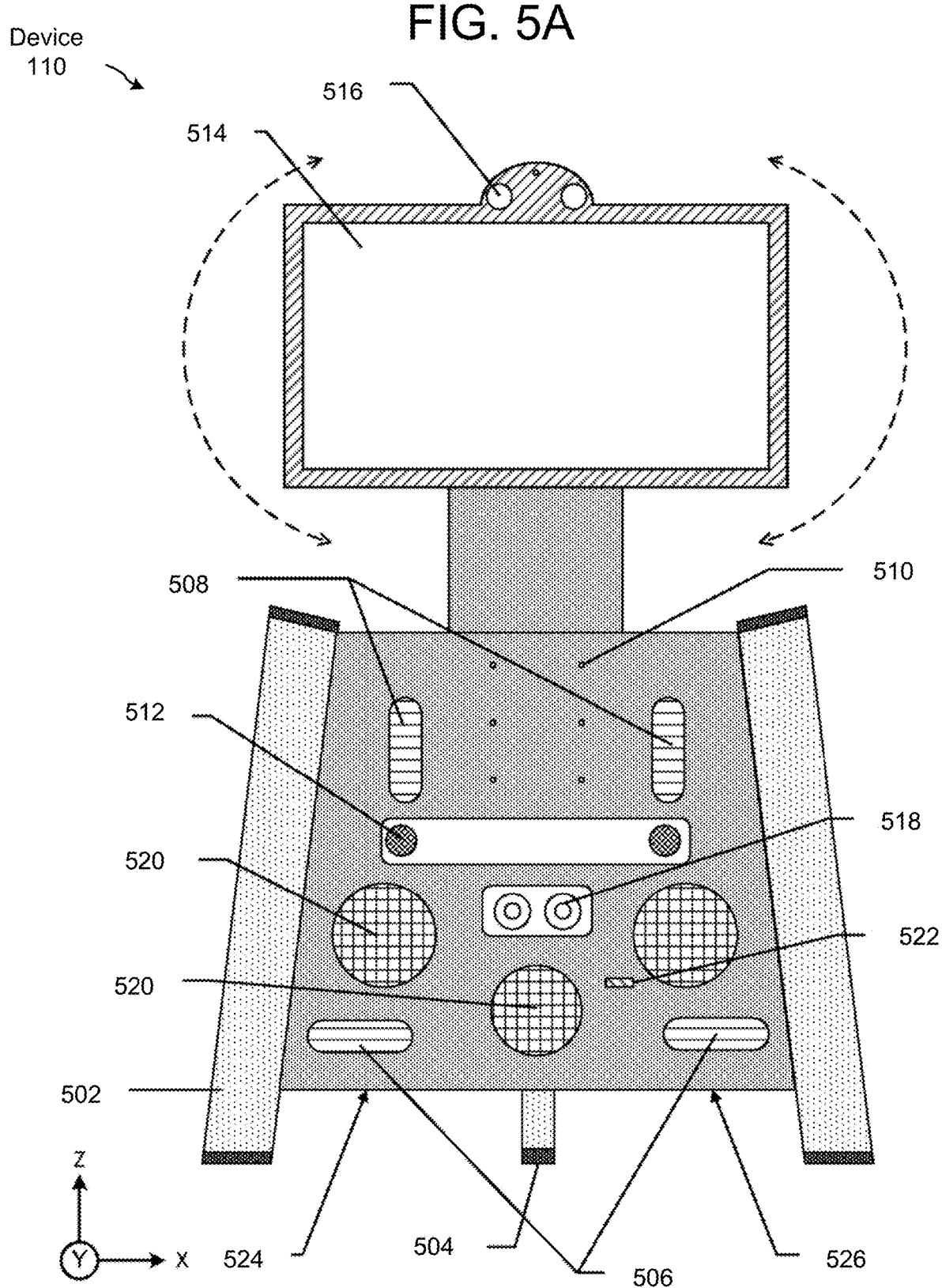

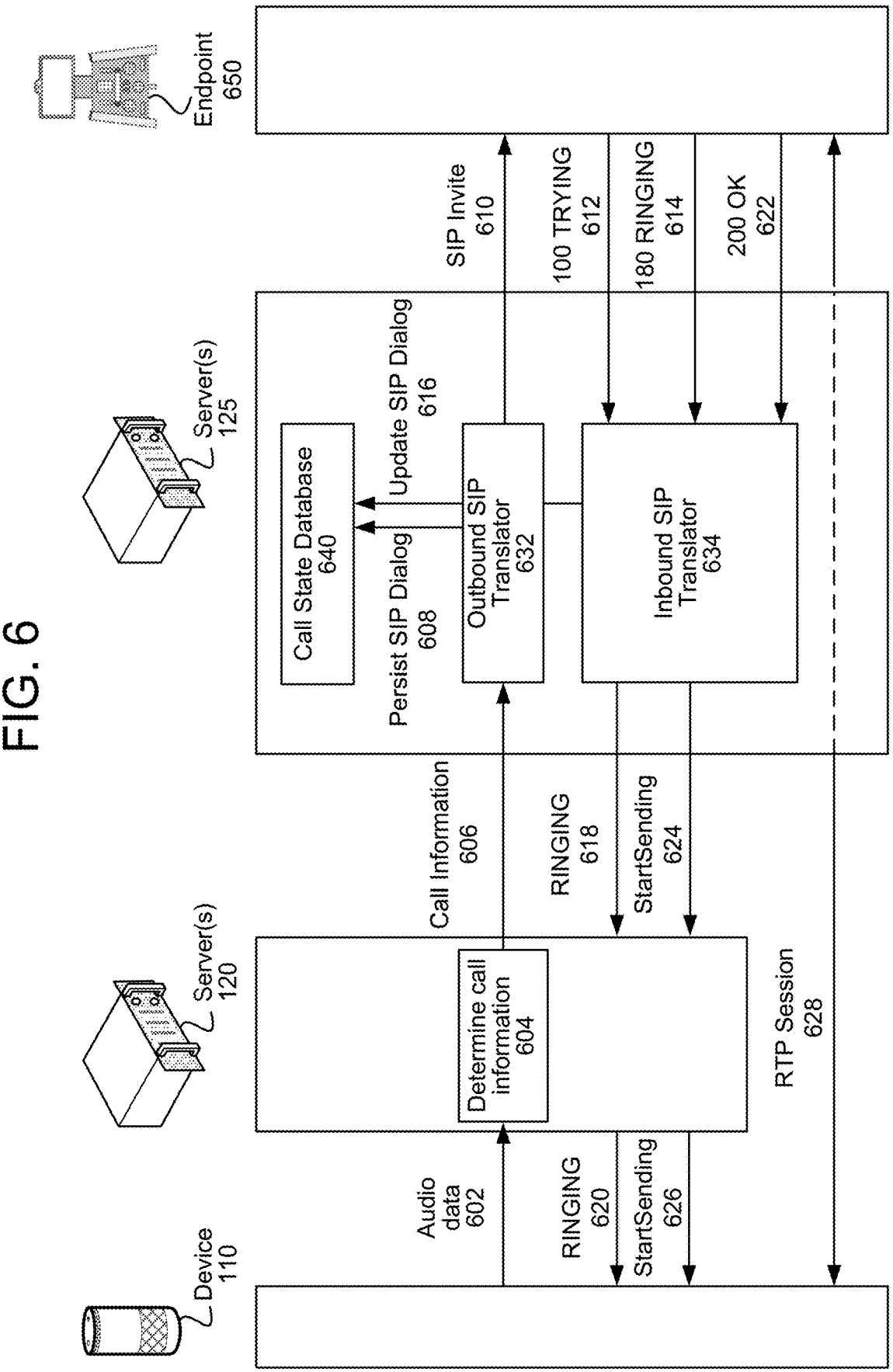

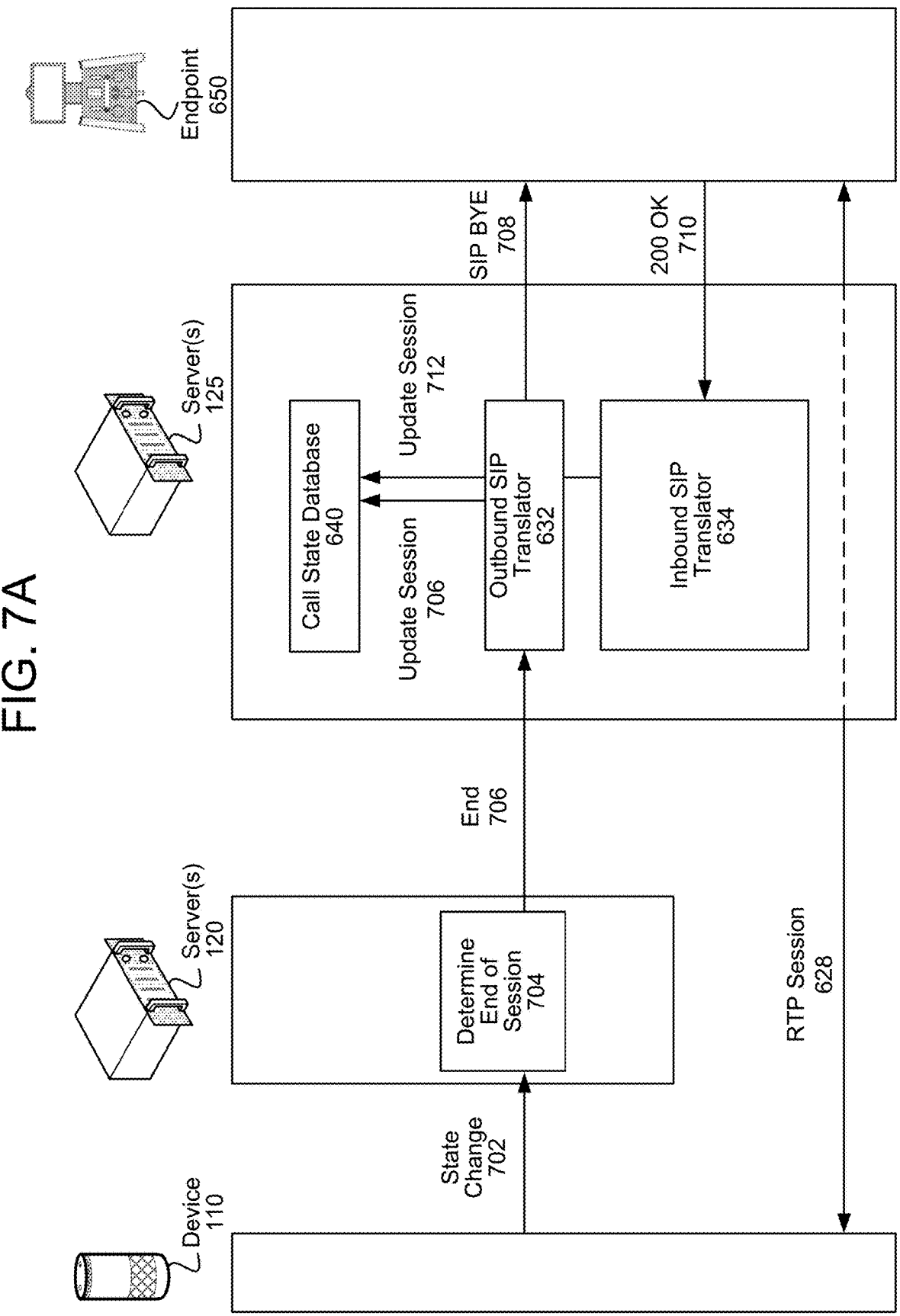

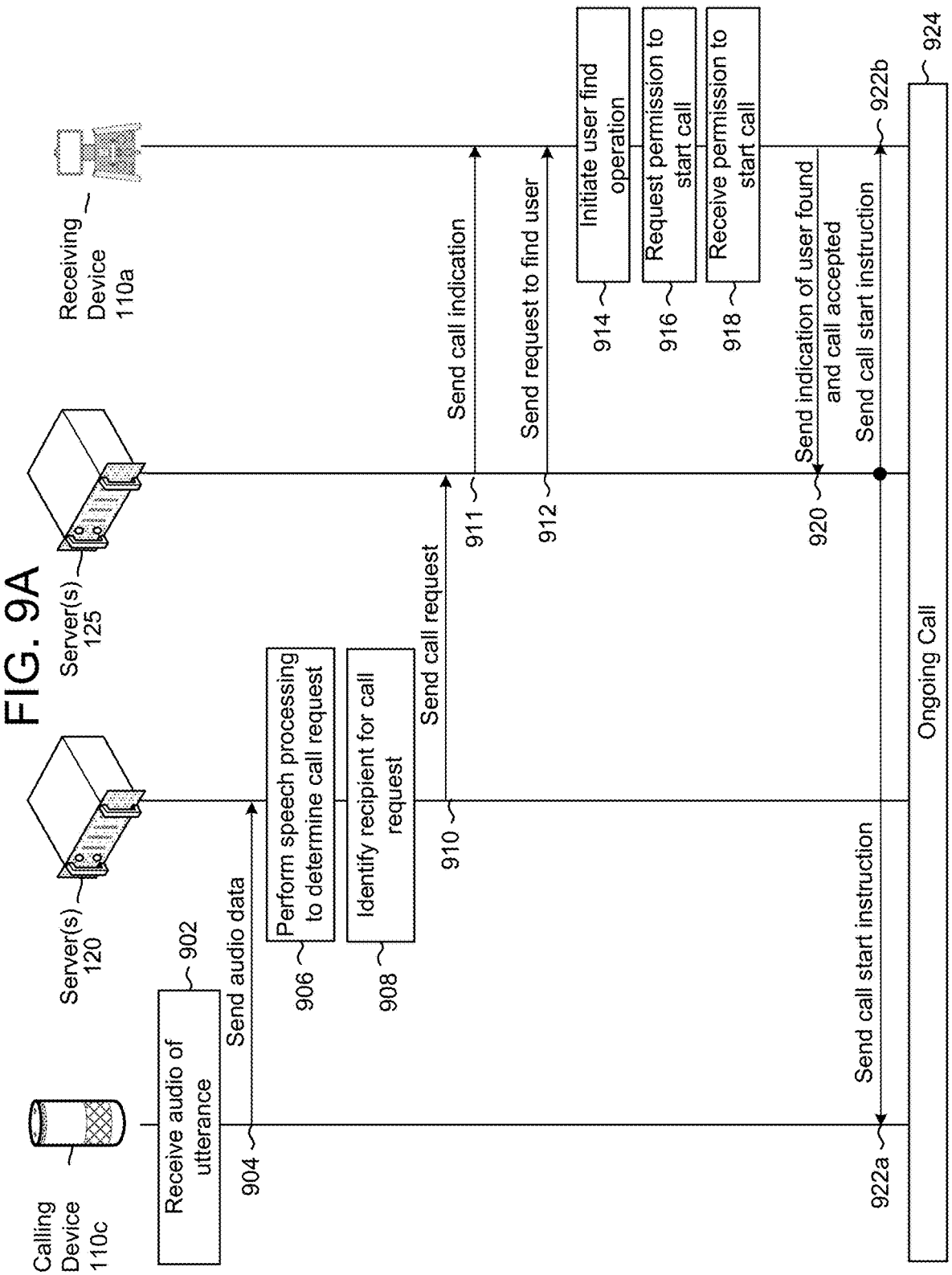

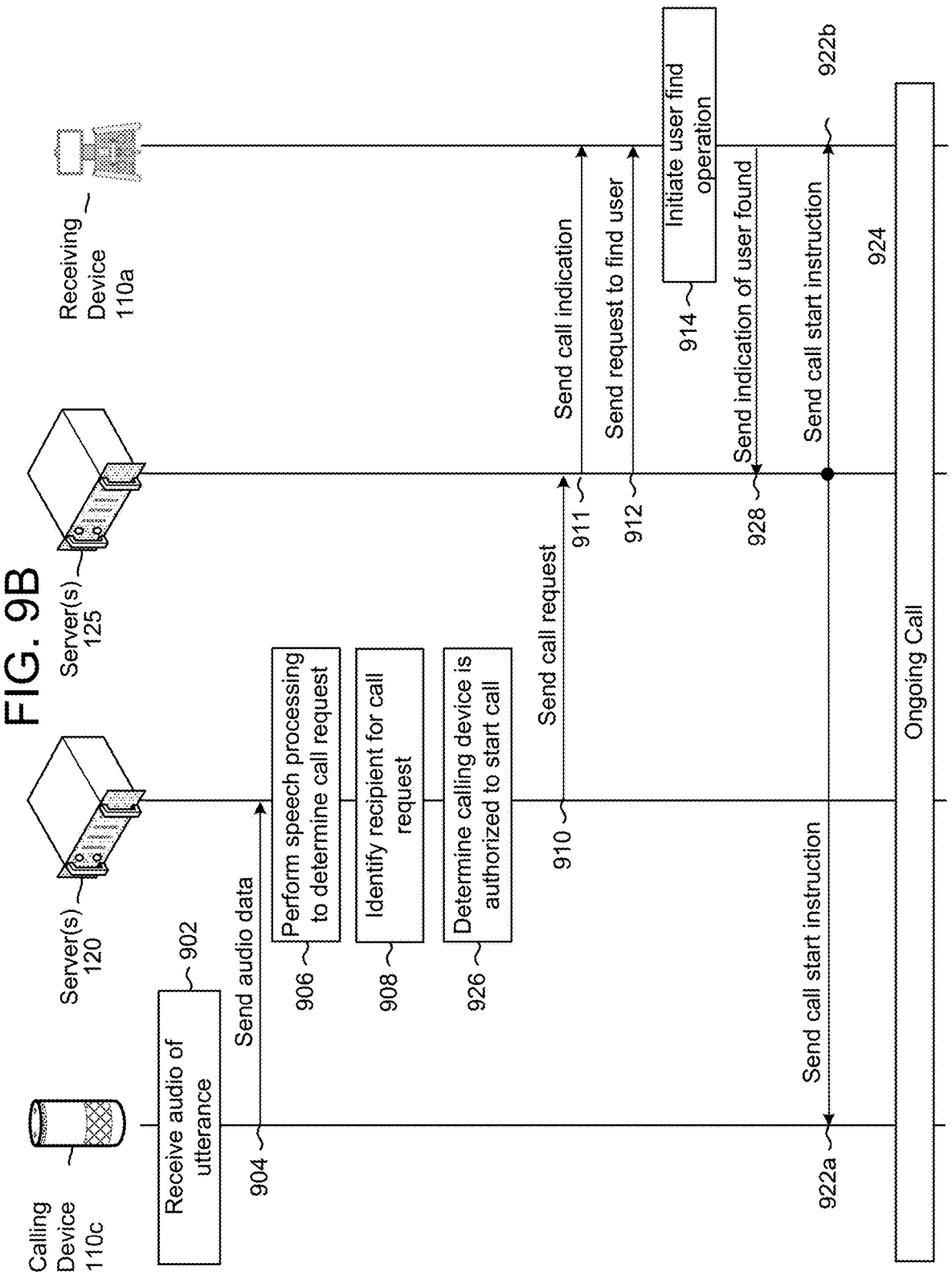

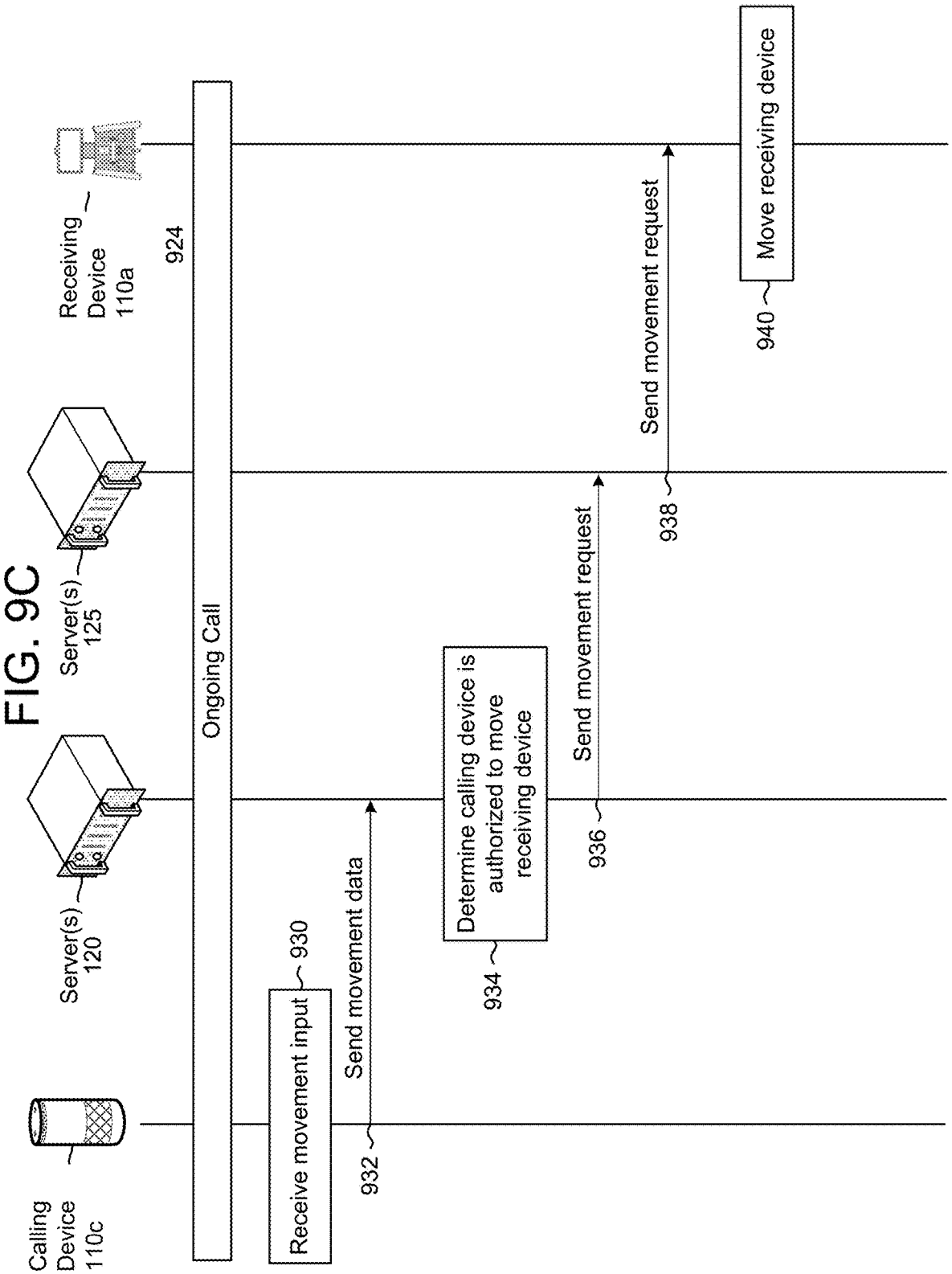

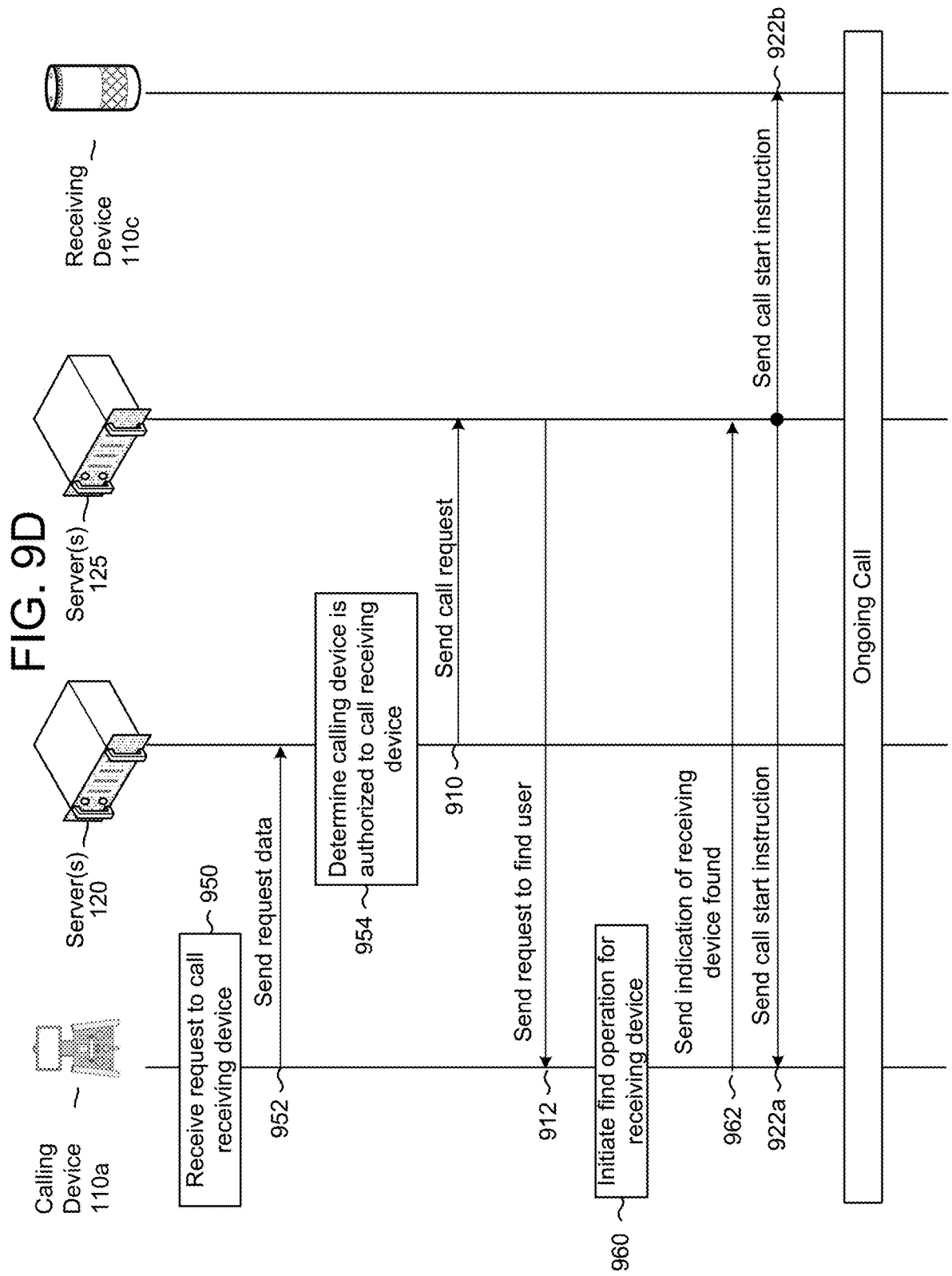

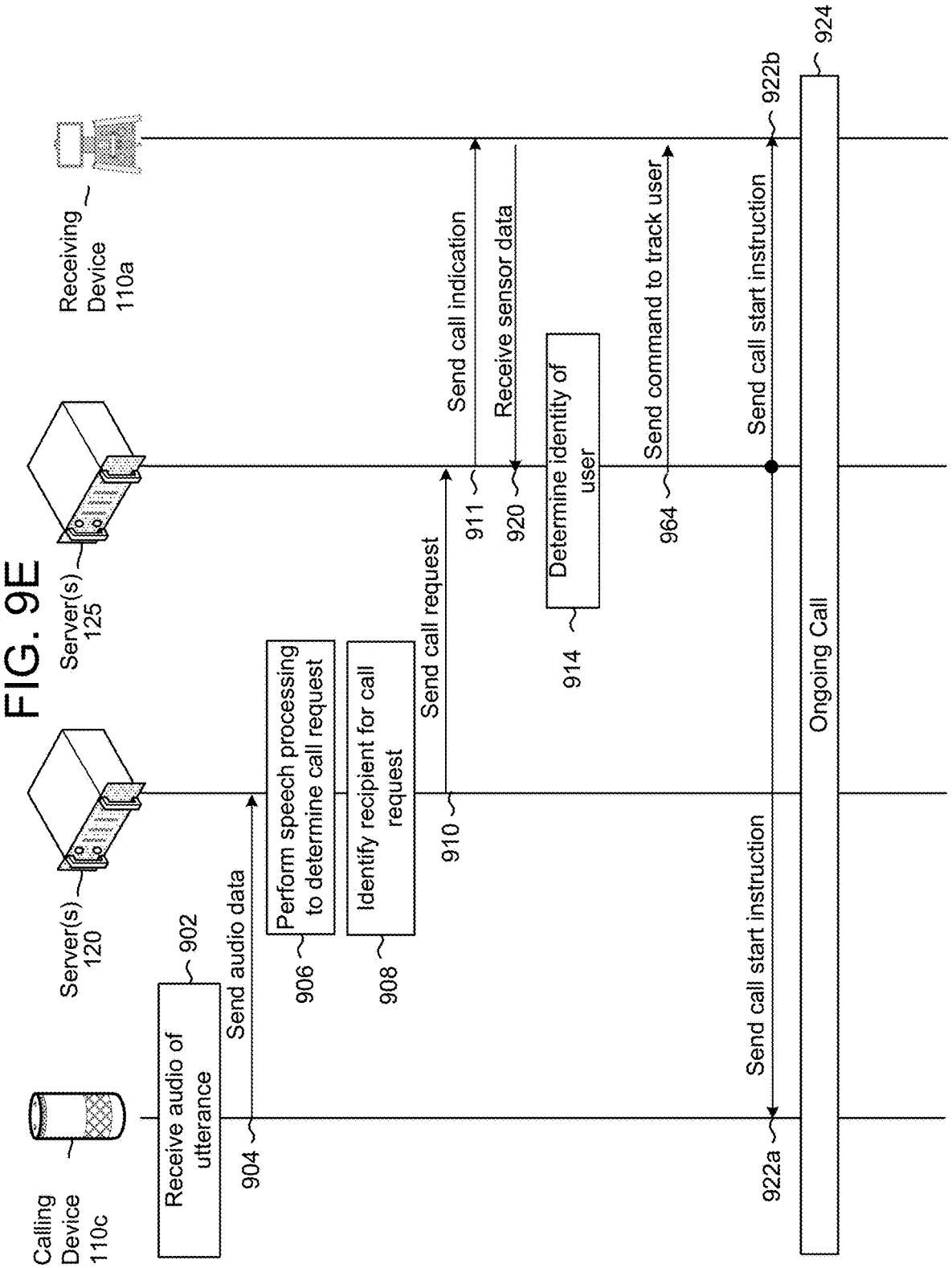

COMMUNICATION WITH USER PRESENCE

CROSS-REFERENCE TO RELATED APPLICATION

This application is a continuation of, and claims the benefit of priority of, U.S. Non-Provisional patent application Ser. No. 16/141,172, filed Sep. 25, 2018, and entitled "COMMUNICATION WITH USER PRESENCE." The contents of which is expressly incorporated herein by reference in its entirety.

BACKGROUND

Computing devices equipped with speech-recognition systems have progressed to a point at which humans are able to interact with the devices using their voices. Such systems employ techniques to identify the words spoken by a human user based on the various qualities of a received audio input. Speech recognition combined with natural-language understanding processing techniques enable speech-based user control of a computing device to perform tasks based on the user's spoken commands. The combination of speech recognition and natural language understanding processing techniques is referred to herein as speech processing. Speech processing may also involve transforming a user's speech into text or other type of data, which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A, 5B, and 5C illustrate views of an autonomously mobile voice-controlled device according to embodiments of the present disclosure.

FIG. 6 illustrates an example of signaling to initiate a communication session according to examples of the present disclosure.

FIGS. 7A-7B illustrate examples of signaling to end a communication session according to examples of the present disclosure.

FIGS. 9A-9E illustrate signal flow diagrams according to embodiments of the present disclosure.

DETAILED DESCRIPTION

Figure 1:
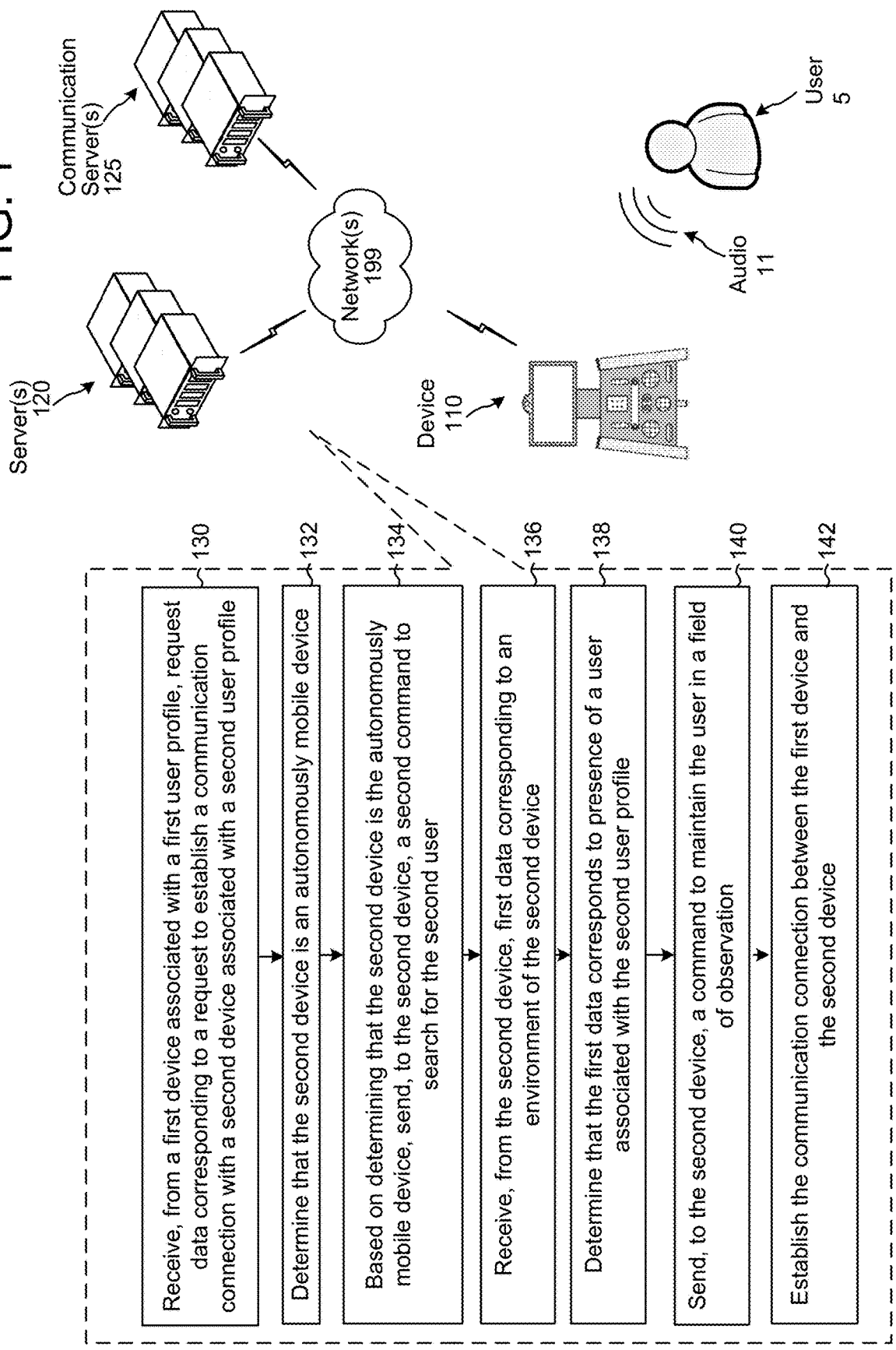
FIG. 1 illustrates system for establishing communications with an autonomously mobile device according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text data corresponding to natural language. ASR and NLU are often used together as part of a speech-processing system. Text-to-speech (TTS) is a field of computer science concerning transforming text data into audio data that resembles human speech.

Certain systems may be configured to perform actions responsive to user inputs. For example, for the user input of "Alexa, play that one song by Toto," a system may output a song called "Africa" performed by a band named Toto. For further example, for the user input of "Alexa, what is the weather," a system may output synthesized speech representing weather information for a geographic location of the user. In a further example, for the user input of "Alexa, make me a restaurant reservation," a system may book a reservation with an online reservation system of the user's favorite restaurant. In a still further example, the user input may include "Alexa, call mom" where the system may identify a contact for "mom" in the user's contact list, identify a device corresponding to the contact for "mom," and initiate a call between the devices.

In various embodiments of the present disclosure, an autonomously mobile device may be used to communicate, using audio and/or video communication, with a user of the device. The user of the device may request to initiate the communication or the device may receive, from another device, a request to initiate the communication. One or more server(s) may receive the request(s) and determine that the device is autonomously mobile. As the term is used herein, autonomously mobile refers to the device moving a portion of the device, such as a screen, camera, or microphone or movement of the device itself through an environment by receiving input data from one or more sensors and determining the movement based thereon.

In some embodiments, the autonomously mobile device receives input data from one or more sensors, such as a camera, microphone, and/or other input sensor; presence of a user proximate the device is determined based thereon. The determination of the presence of the user may be made by the device; in some embodiments, the device transmits the input data to one or more remote devices, such as servers, which determine presence of the user. The server(s) may determine the identity of the user based on the input data by comparing the input data to other data associated with the user, such as vocal and/or facial characteristics stored in a user profile associated with the user.

Based on determining the presence and/or identity of the user, the autonomously mobile device may determine that the user has moved in the environment and maintain the user in a field of observation using one or more input and/or output devices. For example, the autonomously mobile device may move a camera to track movement of the user or may configure a microphone array to reflect movement of the user. The autonomously mobile device may distinguish between the user and another person proximate the device; the autonomously mobile device may continue to track the user even if, for example, the user has stopped speaking and/or the other person has begun speaking.

FIG. 1 illustrates a system configured to establish communications with an autonomously mobile device in accordance with embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system may include one or more autonomously mobile voice-controlled devices 110 in an environment (such as home or office) of a user 5 and one or more speech/command processing server(s) 120 connected to the device 110 using one or more networks 199. Further, one or more communication servers 125 may also be connected to the server(s) 120 and/or device 110.

An autonomously mobile device 110 may be used to facilitate communication between a first user and a second user As explained in greater detail below, when referring to the autonomously mobile device 110 in the context of other devices, the autonomously mobile device 110 may be referred to as a "device 110a," a second voice-controlled device such as a smartphone may be referred to as a "device 110b," and a third voice-controlled device such as a smart speaker may be referred to as a "device 110c."

In various embodiments, the autonomously mobile device 110 is capable of movement using one or motors powering one or more wheels, treads, robotic limbs, or similar actuators. The device 110 may further include one or more display screens for displaying information to a user 5 and/or receiving touch input from a user. The device 110 may further include a microphone or microphone array (which may include two or more microphones) and one or more loudspeakers. The microphone/microphone array and loudspeakers may be used to capture audio 11 (e.g., an utterance from the user 5); the utterance may be, for example, a command or request. The device 110 may be used to output audio to the user 5, such as audio related to receipt of the command or audio related to a response to the request.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant that may move about a room or rooms to provide a user with requested information or services. In other embodiments, the device 110 may be a smart speaker, smart phone, or other such device. The disclosure is not, however, limited to only these devices or components, and the autonomously mobile device 110 may include additional components without departing from the disclosure.

FIG. 1 illustrates a system and method for establishing a communication connection between a first device of a first user and a second device of a second user. The server(s) 120/125 receive (130), from a first device associated with a first user profile, request data corresponding to a request to establish a communication connection with a second device corresponding to a second user profile. The server(s) 120/125 may determine that the user profile is associated with the second user and that a second device is associated with the second user profile. The server(s) 120/125 determine (132) that the second device is an autonomously mobile device. Based on determining that the second device is the autonomously mobile device, the server(s) 120/125 send (134), to the second device, a second command to search for the second user. The server(s) may 120/125 receive, from the second device, further data indicating that the second user is proximate the second device. The server(s) determine (138) that the first data corresponds to presence of the user and send (140) a command to maintain the user in a field of observation. The server(s) 120/125 then establish (142) the communication connection between the first device and the second device without receiving the authorization from the second device.

Figure 2:
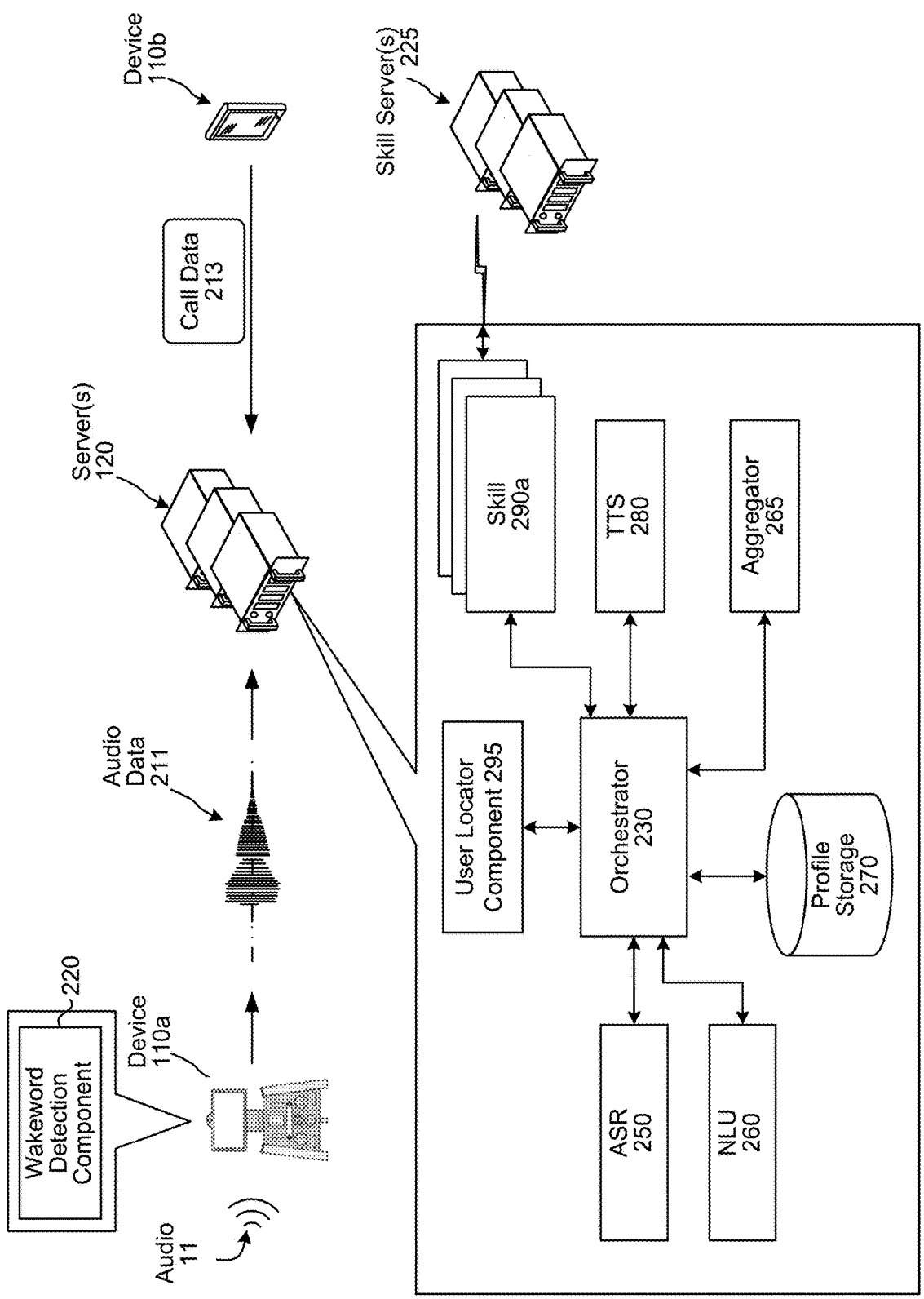
FIG. 2 is a conceptual diagram of components of a system according to embodiments of the present disclosure.

The system may operate using various components as illustrated in FIG. 2. The various components may be located on same or different physical devices. Communication between various components may occur directly or across a network(s) 199.

An audio capture component(s), such as a microphone or array of microphones disposed on or in the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110a. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to an ASR component 250. The ASR component 250 transcribes the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data output by the ASR component 250 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The device 110*b* may send text data 213 to the server(s) 120. Upon receipt by the server(s) 120, the audio data 213 may be sent to the orchestrator component 230, which may send the text data 213 to the NLU component 260.

The NLU component 260 attempts to make a semantic interpretation of the phrase(s) or statement(s) represented in the text data input therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the server(s) 120, a skill component 290, a skill server(s) 225, etc.) to execute the intent. For example, if the text data corresponds to "play a song by Toto," the NLU component 260 may determine an intent that the system output music and may identify "Toto" as an artist. For further example, if the text data corresponds to "what is the weather," the NLU component 260 may determine an intent that the system output weather information associated with a geographic location of the device 110*b*. In another example, if the text data corresponds to "turn off the lights," the NLU component 260 may determine an intent that the system turn off lights associated with the device 110 or the user 5.

The NLU component 260 may send NLU results data (which may include tagged text data, indicators of intent, etc.) to the orchestrator component 230. The orchestrator component 230 may send the NLU results data to a skill component(s) 290 configured to perform an action at least partially responsive the user input. The NLU results data may include a single NLU hypothesis, or may include an N-best list of NLU hypotheses.

A "skill component" may be software running on the server(s) 120 that is akin to a software application running on a traditional computing device. That is, a skill component 290 may enable the server(s) 120 to execute specific functionality in order to provide data or produce some other requested output. The server(s) 120 may be configured with more than one skill component 290. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 290 may operate in conjunction between the server(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

In addition or alternatively to being implemented by the server(s) 120, a skill component 290 may be implemented at least partially by a skill server(s) 225. Such may enable a skill server(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may be configured with a single skill component 290 dedicated to interacting with more than one skill server 225.

Unless expressly stated otherwise, reference to a skill, skill device, or skill component may include a skill component 290 operated by the server(s) 120 and/or the skill server(s) 225. Moreover, the functionality described herein as a skill may be referred to using many different terms, such as an action, bot, app, or the like.

The server(s) 120 may include a TTS component 280 that generates audio data (e.g., synthesized speech) from text data using one or more different methods. Text data input to the TTS component 280 may come from a skill component 290, the orchestrator component 230, or another component of the system.

In one method of speech synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

A user input may be received as part of a dialog between a user and the system. A dialog may correspond to various user inputs and system outputs. When the server(s) 120 receives a user input, the server(s) 120 may associate the data (e.g., audio data or text data) representing the user input with a session identifier. The session identifier may be associated with various speech processing data (e.g., an intent indicator(s), a category of skill to be invoked in response to the user input, etc.). When the system invokes the skill, the system may send the session identifier to the skill in addition to NLU results data. If the skills outputs data from presentment to the user, the skill may associate the data with the session identifier. The foregoing is illustrative and, thus, one skilled in the art will appreciate that a session identifier may be used to track data transmitted between various components of the system. A session identifier may be closed (e.g., a dialog between a user and the system may end) after a skill performs a requested action (e.g., after the skill causes content to be output to the user).

The server(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The user profile may further include information regarding which other users, devices, and/or groups a given user associated with the user profile has granted authorization to establish a communication connection with one or more devices associated with the user profile—without necessarily granting said authorization again at the time of establishment of the communication connection. For example, a user profile may grant permission to a spouse to establish, using the spouse's smartphone, a communication connection with an autonomously mobile device associated with the user profile without again granting permission at the time of establishment of the communication connection. In another example, a user profile may grant similar permission to a doctor, caregiver, therapist, or similar medical or care professional. Similarly, a parent may configure a child's user profile to authorize communication requests from the parent to a device associated with the child.

The profile storage 270 may include one or more device profiles. Each device profile may be associated with a different device identifier, and each device profile may include various device-identification information. For example, the device-identification information may include a device name, device type, device serial number, and/or device address. In some embodiments, the device-identification information indicates whether a given device includes a voice interface, a touchscreen interface, and/or a keyboard/mouse interface. The device-identification information may also indicate whether the device is autonomously mobile and/or capable of moving a camera and video screen. Thus, as described in greater detail below, if a first device requests establishment of a communication connection with a second device, a server(s) 120 may determine, using a device profile associated with the second device, that the second device is an autonomously mobile device and may enable functionality specific to the autonomously mobile device, such as searching an environment for a user of the autonomously mobile device.

Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a user locator component 295 that recognizes one or more users associated with data input to the system. The user locator component 295 may take as input the audio data 211. The user locator component 295 may perform user recognition by comparing audio characteristics in the audio data 211 to stored audio characteristics of users. The user locator component 295 may also or alternatively perform user recognition by comparing biometric data (e.g., fingerprint data, iris data, etc.), received by the system in correlation with the present user input, to stored biometric data of users. The user locator component 295 may also or alternatively perform user recognition by comparing image data (e.g., including a representation of at least a feature of a user), received by the system in correlation with the present user input, with stored image data including representations of features of different users. The user locator component 295 may perform additional user recognition processes, including those known in the art. For a particular user input, the user locator component 295 may perform processing with respect to stored data of users associated with the device that captured the user input.

The user locator component 295 determines whether user input originated from a particular user. For example, the user locator component 295 may generate a first value representing a likelihood that the user input originated from a first user, a second value representing a likelihood that the user input originated from a second user, etc. The user locator component 295 may also determine an overall confidence regarding the accuracy of user recognition operations.

The user locator component 295 may output a single user identifier corresponding to the most likely user that originated the user input. Alternatively, the user locator component 295 may output an N-best list of user identifiers with respective values representing likelihoods of respective users originating the user input. The output of the user locator component 295 may be used to inform NLU processing, processing performed by a skill component 290, as well as processing performed by other components of the system.

Figure 3:
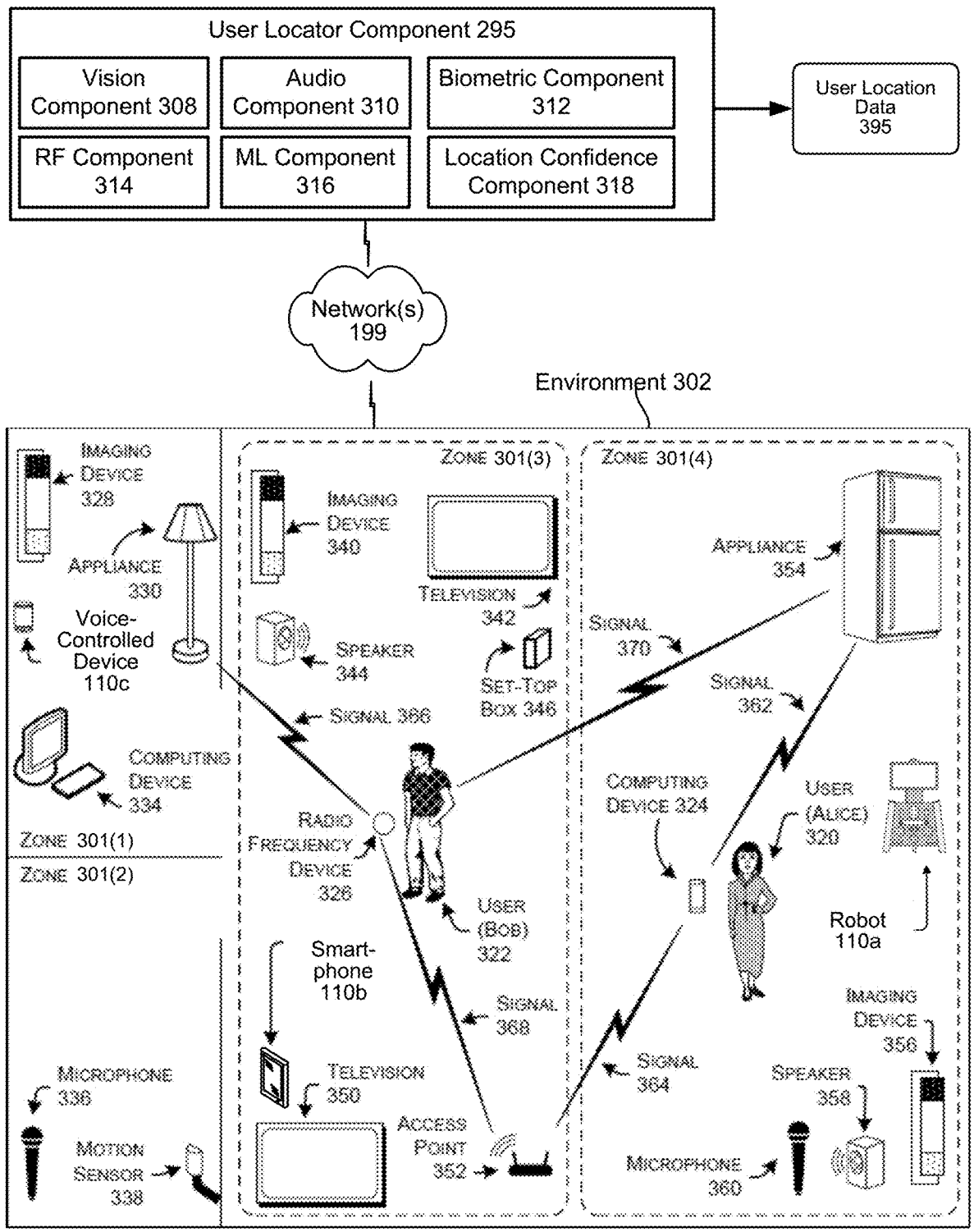
FIG. 3 is a schematic diagram of an illustrative architecture in which sensor data is used to determine locations of users according to embodiments of the present disclosure.

The user locator component 295 may determine the location of one or more users using a variety of data. As illustrated in FIG. 3, the user locator component 295 may include one or more components including a vision component 308, an audio component 310, a biometric component 312, a radio frequency component 314, a machine learning component 316, and a location confidence component 318. In some instances, the user locator component 295 may monitor data and determinations from one or more components to determine an identity of a user and/or a location of a user in an environment 302. The user locator component 295 may output user location data 395 which may include a user identifier matched with location information as to where the system believes the particular user of the user identifier is located. The location information may include geographic information (such as an address, city, state, country, geo-position (e.g., GPS coordinates), velocity, latitude, longitude, altitude, or the like). The location information may also include a device identifier, zone identifier or environment identifier corresponding to a device/zone/environment the particular user is nearby/within. Output of the user locator component 295 may be used to inform natural language component 260 processes as well as processing performed by skills 290, routing of output data, permission access to further information, etc. The details of the vision component 308, the audio component 310, the biometric component 312, the radio frequency component 314, the machine learning component 316, and the location confidence component 318 are provided below following a description of the environment 302.

In some instances, the environment 302 may represent a home or office associated with a user 320 "Alice" and/or a user 322 "Bob." In some instances, the user 320 "Alice" may be associated with a computing device 324, such as a smartphone. In some instances, the user 322 "Bob" may be associated with a radio frequency device 326, such as a wearable device (e.g., a smartwatch) or an identifier beacon.

The environment 302 may include, but is not limited to, a number of devices that may be used to locate a user. For example, within zone 301(1), the environment 302 may include an imaging device 328, an appliance 330, an smart speaker 110c, and a computing device 334. Within zone 301(2), the environment 302 may include a microphone 336 and a motion sensor 338. Within zone 301(3), the environment may include an imaging device 340, a television 342, a speaker 344, a set-top box 346, a smartphone 110b, a television 350, and an access point 352. Within zone 301(4), the environment 302 may include an appliance 354, an imaging device 356, a speaker 358, a device 110a, and a microphone 360.

Further, in some instances, the user-locator component 295 may have information regarding the layout of the environment 302, include details regarding which devices are in which zones, the relationship between zones (e.g., which rooms are adjacent), and/or the placement of individual devices within each zone. In some instances, the user locator component 295 can leverage knowledge of the relationships between zones and the devices within each zone to increase a confidence level of user identity and location as a user moves about the environment 302. For example, in a case in which the user 322 is in zone 301(3) and subsequently moves beyond a field of view of the imaging device 340 into the zone 301(2), the user locator component 295 may infer a location and/or identity of the user to determine with a high confidence level (in combination with data from one or more other devices) that any motion detected by the motion sensor 338 corresponds to movement by the user 322.

In some instances, the vision component 308 may receive data from one or more sensors capable of providing images (e.g., such as the imaging devices 328, 340, 356 and the computing devices 324 and 334) or sensors indicating motion (e.g., such as the motion sensor 338). In some instances, the vision component 308 can perform facial recognition or image analysis to determine an identity of a user and to associate that identity with a user profile associated with the user. In some instances, when a user (e.g., the user 322 "Bob") is facing the imaging device 340, the vision component 308 may perform facial recognition and identify the user 322 with a high degree of confidence. In some instances, the vision component 308 may have a low degree of confidence of an identity of a user, and the user locator component 295 may utilize determinations from additional components to determine an identity and/or location of a user. In some instances, the vision component 308 can be used in conjunction with other components to determine when a user is moving to a new location within the environment 302. In some instances, the vision component 308 can receive data from one or more imaging devices to determine a layout of a zone or room, and/or to determine which devices are in a zone and where they are located. In some instances, data from the vision component 308 may be used with data from the audio component 310 to identify what face appears to be speaking at the same time audio is captured by a particular device the user is facing for purposes of identifying a user who spoke an utterance.

In some instances, the environment 302 may include biometric sensors that may transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. In some instances, the biometric component 312 may distinguish between a user and sound from a television, for example. Thus, the biometric component 312 may incorporate biometric information into a confidence level for determining an identity and/or location of a user. In some instances, the biometric information from the biometric component 312 can be associated with a specific user profile such that the biometric information uniquely identifies a user profile of a user.

In some instances, the radio frequency (RF) component 314 may use RF localization to track devices that a user may carry or wear. For example, as discussed above, the user 320 (and a user profile associated with the user) may be associated with a computing device 324. The computing device 324 may emit RF signals (e.g., Wi-Fi, Bluetooth®, etc.), which are illustrated as signals 362 and 364. As illustrated, the appliance 354 may detect the signal 362 and the access point 352 may detect the signal 364. In some instances, the access point 352 and the appliance 354 may indicate to the RF component 314 the strength of the signals 364 and 362 (e.g., as a received signal strength indication (RSSI)), respectively. Thus, the RF component 314 may compare the RSSI for various signals and for various appliances and may determine an identity and/or location of a user (with an associated confidence level). In some instances, the RF component 314 may determine that a received RF signal is associated with a mobile device that is associated with a particular user. In some instances, a device (e.g., the access point 352) may be configured with multiple antennas to determine a location of a user relative to the device using beamforming or spatial diversity techniques. In such a case, the RF component 314 may receive an indication of the direction of the user relative to an individual device.

As illustrated, the appliance 330 may receive a signal 366 from the RF device 326 associated with the user and a user profile, while the access point 352 may receive a signal 368. Further, the appliance 354 can receive a signal 370 from the RF device 326. In an example where there is some uncertainty about an identity of the users in zones 301(3) and 301(4), the RF component 314 may determine that the RSSI of the signals 362, 364, 366, 368, and/or 370 increases or decreases a confidence level of an identity and/or location of the users, such as the user 320 and 324. For example, if an RSSI of the signal 362 is higher than the RSSI of the signal 370, the RF component may determine that it is more likely that a user in the zone 301(4) is the user 320 than the user 322. In some instances, a confidence level of the determination may depend on a relative difference of the RSSIs, for example.

In some instances a voice-controlled device 110, or another device proximate to the voice-controlled device 110 may include some RF or other detection processing capabilities so that a user who speaks an utterance may scan, tap, or otherwise acknowledge his/her personal device (such as a phone) to a sensing device in the environment 302. In this manner the user may "register" with the system for purposes of the system determining who spoke a particular utterance. Such a registration may occur prior to, during, or after speaking of an utterance.

In some instances, the machine-learning component 316 may track the behavior of various users in the environment as a factor in determining a confidence level of the identity and/or location of the user. For example, the user 320 may adhere to a regular schedule, such that the user 320 is outside the environment 302 during the day (e.g., at work or at school). In this example, the machine-learning component 316 may factor in past behavior and/or trends in determining the identity and/or location. Thus, the machine-learning component 316 may use historical data and/or usage patterns over time to increase or decrease a confidence level of an identity and/or location of a user.

In some instances, the location-confidence component 318 receives determinations from the various components 308, 310, 312, 314, and 316, and may determine a final confidence level associated with the identity and/or location of a user. In some embodiments, the confidence level may determine whether an action is performed. For example, if a user request includes a request to unlock a door, a confidence level may need to be above a threshold that may be higher than a confidence level needed to perform a user request associated with playing a playlist or resuming a location in an audiobook, for example. The confidence level or other score data may be included in user location data 395.

In some instances, the audio component 310 may receive data from one or more sensors capable of providing an audio signal (e.g., the devices 110a-c, the microphones 336, 360, the computing devices 324, 334, and/or the set-top box 346) to facilitate locating a user. In some instances, the audio component 310 may perform audio recognition on an audio signal to determine an identity of the user and an associated user profile. Further, in some instances, the imaging devices 328, 340, 356 may provide an audio signal to the audio component 310. In some instances, the audio component 310 is configured to receive an audio signal from one or more devices and may determine a sound level or volume of the source of the audio. In some instances, if multiple sources of audio are available, the audio component 310 may determine that two audio signals correspond to the same source of sound, and may compare the relative amplitudes or volumes of the audio signal to determine a location of the source of sound. In some instances, individual devices may include multiple microphone and may determine a direction of a user with respect to an individual device. In some instances, aspects of the server(s) 120 may be configured at a computing device (e.g., a local server) within the environment 302. Thus, in some instances, the audio component 310 operating on a computing device in the environment 302 may analyze all sound within the environment 302 (e.g., without requiring a wake word) to facilitate locating a user. In some instances, the audio component 310 may perform voice recognition to determine an identity of a user.

The audio component 310 may also perform user identification based on information relating to a spoken utterance input into the system for speech processing. For example, the audio component 310 may take as input the audio data 211 and/or output data from the speech recognition component 250. The audio component 310 may determine scores indicating whether the command originated from particular users. For example, a first score may indicate a likelihood that the command originated from a first user, a second score may indicate a likelihood that the command originated from a second user, etc. The audio component 310 may perform user recognition by comparing speech characteristics in the audio data 211 to stored speech characteristics of users.

Figure 4:
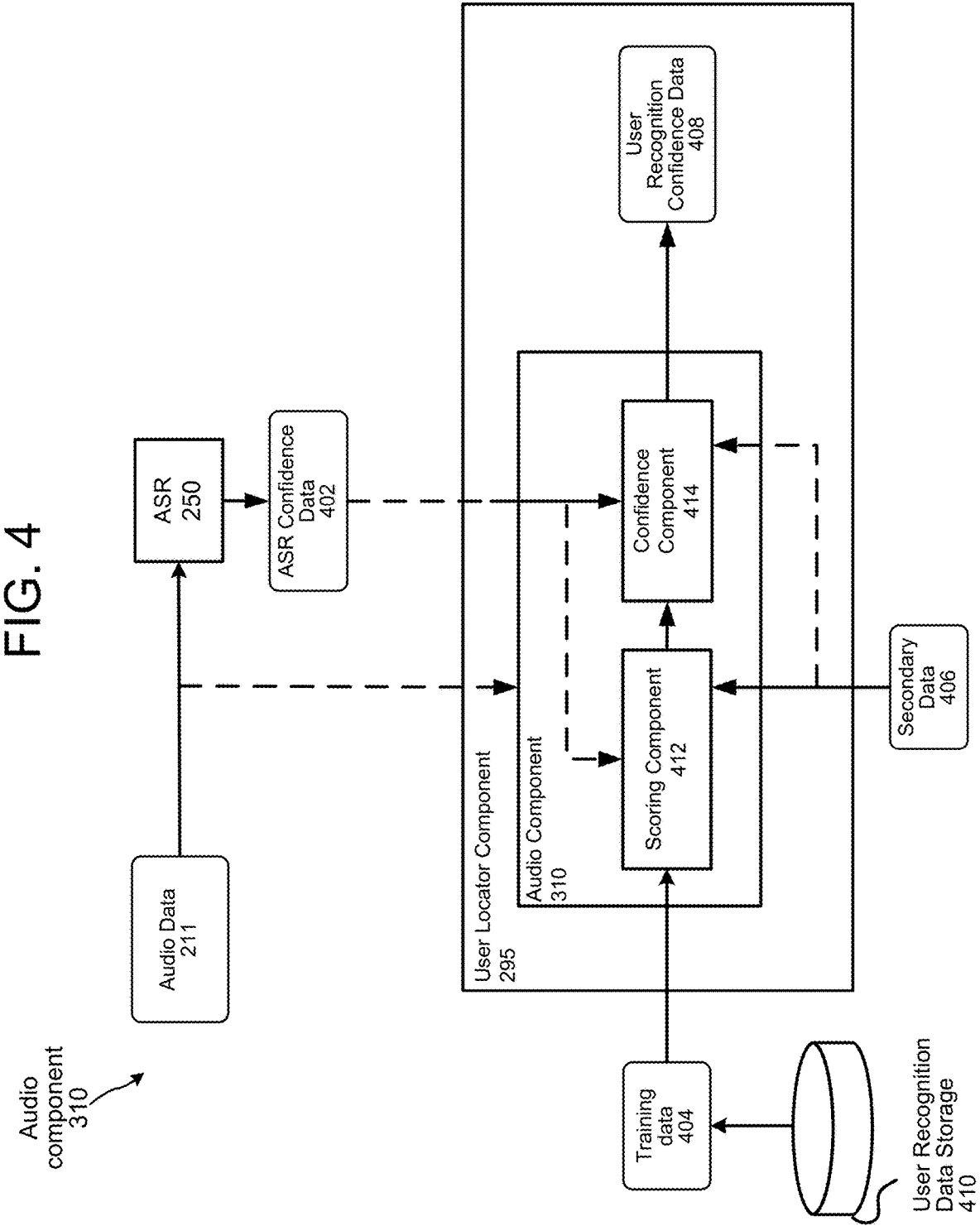
FIG. 4 is a system flow diagram illustrating user recognition according to embodiments of the present disclosure.

FIG. 4 illustrates the audio component 310 of the user-locator component 295 performing user recognition using audio data, for example input audio data 211 corresponding to an input utterance. The ASR component 250 performs ASR on the audio data 211 as described herein. ASR output (i.e., text data) is then processed by the NLU component 260 as described herein.

The ASR component 250 may also output ASR confidence data 402, which is passed to the user-locator component 295. The audio component 310 performs user recognition using various data including the audio data 211, training data 404 corresponding to sample audio data corresponding to known users, the ASR confidence data 402, and secondary data 406. The audio component 310 may output user recognition confidence data 408 that reflects a certain confidence that the input utterance was spoken by one or more particular users. The user recognition confidence data 408 may include an indicator of a verified user (such as a user ID corresponding to the speaker of the utterance) along with a confidence value corresponding to the user ID, such as a numeric value or binned value as discussed below. The user-recognition confidence data 408 may be used by various components, including other components of the user locator component 295, to recognize and locate a user, for example nearby to a particular device, in a particular environment, or the like for purposes of performing other tasks as described herein.

The training data 404 may be stored in a user-recognition data storage 410. The user-recognition data storage 410 may be stored by the server(s) 120 or may be a separate device. Further, the user-recognition data storage 410 may be part of a user profile in the profile storage 270. The user-recognition data storage 410 may be a cloud-based storage. The training data 404 stored in the user-recognition data storage 410 may be stored as waveforms and/or corresponding features/vectors. The training data 404 may correspond to data from various audio samples, each audio sample associated with a known user and/or user identity. For example, each user known to the system may be associated with some set of training data 404 for the known user. The audio component 310 may then use the training data 404 to compare against incoming audio data 211 to determine the identity of a user speaking an utterance. The training data 404 stored in the user-recognition data storage 410 may thus be associated with multiple users of multiple devices. Thus, the training data 404 stored in the storage 410 may be associated with both a user who spoke a respective utterance as well as the voice-controlled device 110 that captured the respective utterance.

To perform user recognition, the audio component 310 may determine the voice-controlled device 110 from which the audio data 211 originated. For example, the audio data 211 may include a tag indicating the voice-controlled device 110. Either the voice-controlled device 110 or the server(s) 120 may tag the audio data 211 as such. The user-locator component 295 may send a signal to the user-recognition data storage 410; the signal may request the training data 404 associated with known users of the voice-controlled device 110 from which the audio data 211 originated. This request may include accessing a user profile(s) associated with the voice-controlled device 110 and then inputting only training data 404 associated with users corresponding to the user profile(s) of the device 110. This inputting limits the universe of possible training data that the audio component 310 considers at runtime when recognizing a user, and thus decreases the amount of time needed to perform user recognition by decreasing the amount of training data 404 needed to be processed. Alternatively, the user-locator component 295 may access all (or some other subset of) training data 404 available to the system. Alternatively, the audio component 310 may access a subset of training data 404 of users potentially within the environment of the voice-controlled device 110 from which the audio data 211 originated, as may otherwise have been determined by the user locator component 295.

If the audio component 310 receives training data 404 as an audio waveform, the audio component 310 may determine features/vectors of the waveform(s) or otherwise convert the waveform into a data format that can be used by the audio component 310 to actually perform the user recognition. The audio component 310 may then identify the user that spoke the utterance in the audio data 211 by comparing features/vectors of the audio data 211 to training features/vectors (either received from the storage 410 or determined from training data 404 received from the storage 410).

The audio component 310 may include a scoring component 412 that determines a score indicating whether an input utterance (represented by audio data 211) was spoken by a particular user (represented by training data 404). The audio component 310 may also include a confidence component 414 which determines an overall confidence as the accuracy of the user recognition operations (such as those of the scoring component 412) and/or an individual confidence for each user potentially identified by the scoring component 412. The output from the scoring component 412 may include scores for all users with respect to which user recognition was performed (e.g., all users associated with the voice-controlled device 110). For example, the output may include a first score for a first user, a second score for a second user, and third score for a third user, etc. Although illustrated as two separate components, the scoring component 412 and confidence component 414 may be combined into a single component or may be separated into more than two components.

The scoring component 412 and confidence component 414 may implement one or more trained-machine learning models (such neural networks, classifiers, etc.) as known in the art. For example, the scoring component 412 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 412 may also use other techniques such as GMMs, generative Bayesian models, or the like, to determine similarity scores.

The confidence component 414 may input various data including information about the ASR confidence 402, utterance length (e.g., number of frames or time of the utterance), audio condition/quality data (such as signal-to-interference data or other metric data), fingerprint data, image data, or other factors to consider how confident the user locator component 295 is with regard to the scores linking users to the input utterance. The confidence component 414 may also consider the similarity scores and user IDs output by the scoring component 412. Thus, the confidence component 414 may determine that a lower ASR confidence represented in the ASR confidence data 402, or poor input audio quality, or other factors, may result in a lower confidence of the audio component 310. Whereas a higher ASR confidence represented in the ASR confidence data 402, or better input audio quality, or other factors, may result in a higher confidence of the audio component 310. Precise determination of the confidence may depend on configuration and training of the confidence component 414 and the models used therein. The confidence component 414 may operate using a number of different machine learning models/techniques such as GMM, neural networks, etc. For example, the confidence component 414 may be a classifier configured to map a score output by the scoring component 412 to a confidence.

The audio component 310 may output user-recognition confidence data 408 specific to a single user or specific to multiple users in the form of an N-best list. For example, the audio component 310 may output user-recognition confidence data 408 with respect to each user indicated in the profile associated with the voice-controlled device 110 from which the audio data 211 was received. The audio component 310 may also output user-recognition confidence data

408 with respect to each user potentially in the location of the voice-controlled device 110 from which the audio data 211 was received, as determined by the user locator component 295.

The user recognition confidence data 408 may include particular scores (e.g., 0.0-1.0, 0-1000, or whatever scale the system is configured to operate). Thus the system may output an N-best list of potential users with confidence scores (e.g., John=0.2, Jane=0.8). Alternatively or in addition, the user-recognition confidence data 408 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John=low, Jane=high). Combined binned and confidence score outputs are also possible. Rather than a list of users and their respective scores and/or bins, the user-recognition confidence data 408 may only include information related to the top scoring user as determined by the audio component 310. The scores and bins may be based on information determined by the confidence component 414. The audio component 310 may also output a confidence value that the scores and/or bins are correct, in which the confidence value indicates how confident the audio component 310 is in the output results. This confidence value may be determined by the confidence component 414.

The confidence component 414 may determine individual user confidences and differences between user confidences when determining the user recognition confidence data 408. For example, if a difference between a first user's confidence score and a second user's confidence score is large, and the first user's confidence score is above a threshold, then the audio component 310 is able to recognize the first user as the user that spoke the utterance with a much higher confidence than if the difference between the users' confidences were smaller.

The audio component 310 may perform certain thresholding to avoid incorrect user recognition results being output. For example, the audio component 310 may compare a confidence score output by the confidence component 414 to a confidence threshold. If the confidence score is not above the confidence threshold (for example, a confidence of "medium" or higher), the user locator component 295 may not output user recognition confidence data 408, or may only include in that data 408 an indication that a user speaking the utterance could not be verified. Further, the audio component 310 may not output user recognition confidence data 408 until enough input audio data 211 is accumulated and processed to verify the user above a threshold confidence. Thus, the audio component 310 may wait until a sufficient threshold quantity of audio data of the utterance has been processed before outputting user recognition confidence data 408. The quantity of received audio data may also be considered by the confidence component 414.

The audio component 310 may default to output-binned (e.g., low, medium, high) user-recognition confidence data 408. Such binning may, however, be problematic from the command processor(s) 290 perspective. For example, if the audio component 310 computes a single binned confidence for multiple users, an application 290 may not be able to determine which user to determine content with respect to. In this situation, the audio component 310 may be configured to override its default setting and output user recognition confidence data 408 including values (e.g., 0.0-1.0) associated with the users associated with the same binned confidence. This enables the application 290 to select content associated with the user associated with the highest confidence value. The user recognition confidence data 408 may also include the user IDs corresponding to the potential user(s) who spoke the utterance.

The user locator component 295 may combine data from components 308-318 to determine the location of a particular user. As part of its audio-based user recognition operations, the audio component 310 may use secondary data 406 to inform user recognition processing. Thus, a trained model or other component of the audio component 310 may be trained to take secondary data 406 as an input feature when performing recognition. Secondary data 406 may include a wide variety of data types depending on system configuration and may be made available from other sensors, devices, or storage such as user profile data 504, etc. The secondary data 406 may include a time of day at which the audio data was captured, a day of a week in which the audio data was captured, the text data, NLU results, or other data.

In one example, secondary data 406 may include image data or video data. For example, facial recognition may be performed on image data or video data received corresponding to the received audio data 211. Facial recognition may be performed by the vision component 308 of the user locator component 295, or by another component of the server(s) 120. The output of the facial recognition process may be used by the audio component. That is, facial recognition output data may be used in conjunction with the comparison of the features/vectors of the audio data 211 and training data 404 to perform more accurate user recognition.

The secondary data 406 may also include location data of the voice-controlled device 110. The location data may be specific to a building within which the voice-controlled device 110 is located. For example, if the voice-controlled device 110 is located in user A's bedroom, such location may increase user recognition confidence data associated with user A, but decrease user recognition confidence data associated with user B.

The secondary data 406 may also include data related to the profile of the device 110. For example, the secondary data 406 may further include type data indicating a type of the autonomously mobile device 110. Different types of speech-detection devices may include, for example, an autonomously mobile device, a smart speaker, a smart watch, a smart phone, a tablet computer, and a vehicle. The type of device 110 may be indicated in the profile associated with the device 110. For example, if the device 110 from which the audio data 211 was received is an autonomously mobile device 110 belonging to user A, the fact that the autonomously mobile device 110 belongs to user A may increase user recognition confidence data associated with user A, but decrease user recognition confidence data associated with user B. Alternatively, if the device 110 from which the audio data 211 was received is a public or semi-public device, the system may use information about the location of the device to cross-check other potential user locating information (such as calendar data, etc.) to potentially narrow the potential users to be recognized with respect to the audio data 211.

The secondary data 406 may additionally include geographic coordinate data associated with the device 110. For example, a profile associated with an autonomously mobile device may indicate multiple users (e.g., user A and user B). The autonomously mobile device may include a global positioning system (GPS) indicating latitude and longitude coordinates of the autonomously mobile device when the audio data 211 is captured by the autonomously mobile device. As such, if the autonomously mobile device is located at a coordinate corresponding to a work location/ building of user A, such location may increase user recognition confidence data associated with user A, but decrease user recognition confidence data of all other users indicated in the profile associated with the autonomously mobile device. Global coordinates and associated locations (e.g., work, home, etc.) may be indicated in a user profile associated with the autonomously mobile device 110. The global coordinates and associated locations may be associated with respective users in the user profile.

The secondary data 406 may also include other data/ signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc., may be reflected in the secondary data 406 and considered by the audio component 310. If a mobile device (such as a phone, Tile, dongle, or other device) known to be associated with a particular user is detected proximate to (for example physically close to, connected to the same WiFi network as, or otherwise nearby) the voice-controlled device 110, this may be reflected in the secondary data 406 and considered by the user locator component 295.

The user-recognition confidence data 408 output by the audio component 310 may be used by other components of the user-locator component 295 and/or may be sent to one or more applications 290, to the orchestrator 230, or to other components. The skill 290 that receives the NLU results and the user recognition confidence score data 408 (or other user location results as output by the user locator component 295) may be determined by the server(s) 120 as corresponding to content responsive to the utterance in the audio data 211. For example, if the audio data 211 includes the utterance "Play my music," the NLU results and user-recognition confidence data 408 may be sent to a music playing skill 290.

A user identified using techniques described herein may be associated with a user identifier, user profile, or other information known about the user by the system. As part of the user recognition/user location techniques described herein the system may determine the user identifier, user profile, or other such information. The profile storage 270 may include data corresponding to profiles that may be used by the system to perform speech processing. Such profiles may include a user profile that links various data about a user such as user preferences, user owned speech controlled devices, user owned other devices (such as speech-controllable devices), address information, contacts, enabled skills, payment information, etc. Each user profile may be associated with a different user identifier (ID). A profile may be an umbrella profile specific to a group of users. That is, a user profile encompasses two or more individual user profiles, each associated with a unique respective user ID. For example, a profile may be a household profile that encompasses user profiles associated with multiple users of a single household. A profile may include preferences shared by all the user profiles encompassed thereby. Each user profile encompassed under a single user profile may include preferences specific to the user associated therewith. That is, each user profile may include preferences unique with respect to one or more other user profiles encompassed by the same profile. A user profile may be a stand-alone profile or may be encompassed under a group profile.

A profile may also be a device profile corresponding to information about a particular device, for example a device identifier, location, owner entity, whether the device is in a public, semi-public, or private location, the device capabilities, device hardware, or the like.

A profile may also be an entity profile, for example belonging to a business, organization or other non-user entity. Such an entity profile may include information that may otherwise be found in a user and/or device profile, only such information is associated with the entity. The entity profile may include information regarding which users and/ or devices are associated with the entity.

The user identification/location techniques described herein (as well as others) may be operated by a device remote from the environment 302, for example by the server(s) 120. In other configurations, the user identification/ location techniques may be wholly or partially operated by a device within the environment 302. For example, the device 110 may be an autonomously mobile device and may include a motor, actuators, and/or other components that allow the device 110 to move within the environment 302 without necessarily receiving a user command to do so.

The device 110 may also include a user-locator component 295 (or portions thereof) and may be capable of locating a user using techniques described herein (as well as others) either on its own or in combination with data received by another device such as server(s) 120, another device local to the environment 302, or the like. In various embodiments, the device 110 and the user-locator component 295 continually or periodically scan the environment for users, and the device 110 maintains a list of users currently in the environment. In other embodiments, the device 110 and the user-locator component 295 determine which users, if any, are in the environment only upon certain actions or requests, such as determination of receipt of an incoming call, detection of a wakeword, or similar actions. Similarly, the device 110 may locate users using the user-locator component 295 and may also, apart from determining user location, further determine user identity using the various techniques described above. Determination of the user identity may occur continually, periodically, or only upon certain actions or requests, such as determination of receipt of an incoming call, detection of a wakeword, or similar actions.

The device 110 may be controlled by a local user using voice input, a touch screen, gestures, or other such input. The device 110 may be also controlled using remote commands from another device 110 and/or from server(s) 120 and/or 125. In various embodiments, one or more application programming interfaces (APIs) may be defined to send and receive commands and/or data to or from the device 110. The APIs may be used by other devices 110 and/or the server(s) 120 and/or 125.

For example, one or more APIs may be defined to implement a "look" command in which the device 110 scans its proximate area for presence of users. When the device 110 receives the look command from, e.g., server(s) 120, it may, for example, use its camera and/or microphone to detect the presence or absence of a user in image and/or video data or determine if audio captured by the microphone contains an utterance corresponding to the user. The device 110 may rotate its camera and/or microphone array to scan its proximate area. In some embodiments, the device 110 uses the user-locator component 295 and corresponding components and techniques to determine presence or absence of one or more users. The device 110 may determine a confidence score for each user regarding his or her absence or presence.

The look command may be sent with (or may include) additional commands or parameters. For example, the look command may specify a length of time to spend looking, information about users that may be proximate the device 110, whether to monitor video and/or audio, or other such parameters. In response to receiving the look command, the device 110 may transmit, to the server(s) 120, information regarding any users found to be proximate the device 110, the confidence score corresponding to each user, or, if no users are found, an indication that no users are proximate the device 110.

Another command related to the API may be a "find" command. When the device 110 receives the find command, it may search its environment for users, particularly if no users are initially found to be proximate the device 110. As described above, the device 110 may travel about its environment into different rooms, hallways, spaces, etc., in search of users. As described above, the device 110 may shorten its search by inferring placement of users in the environment—if, e.g., the device 110 observed a user leave its proximate area through a doorway, the device 110 may begin its search by traveling through that doorway. The find command may, like the look command, be sent with (or may include) additional parameters, such as a length of time to spend finding, rooms or spaces to travel to or avoid, inferences regarding the placement of unseen users, or similar parameters. The device 110 may transmit, in response to the receipt of the find command, information to the server(s) 120, such as number and placement of found users or indication that no users were found.

Other API commands may include a "follow" command, in which the device 110 is commanded to follow a particular user or users as the user or users moves throughout the environment, and a "hangout" command, in which the device 110 is commanded to maintain proximity to a number of users. These commands, like the commands above, may specify additional parameters, such as a length of time to spend following or hanging out, which users to follow, how many users to hang out with, and other similar parameters. The device 110 may similarly send relevant information to the server(s), such as success or failure at following or hanging out and a number of successfully followed users.

Figure 5B:
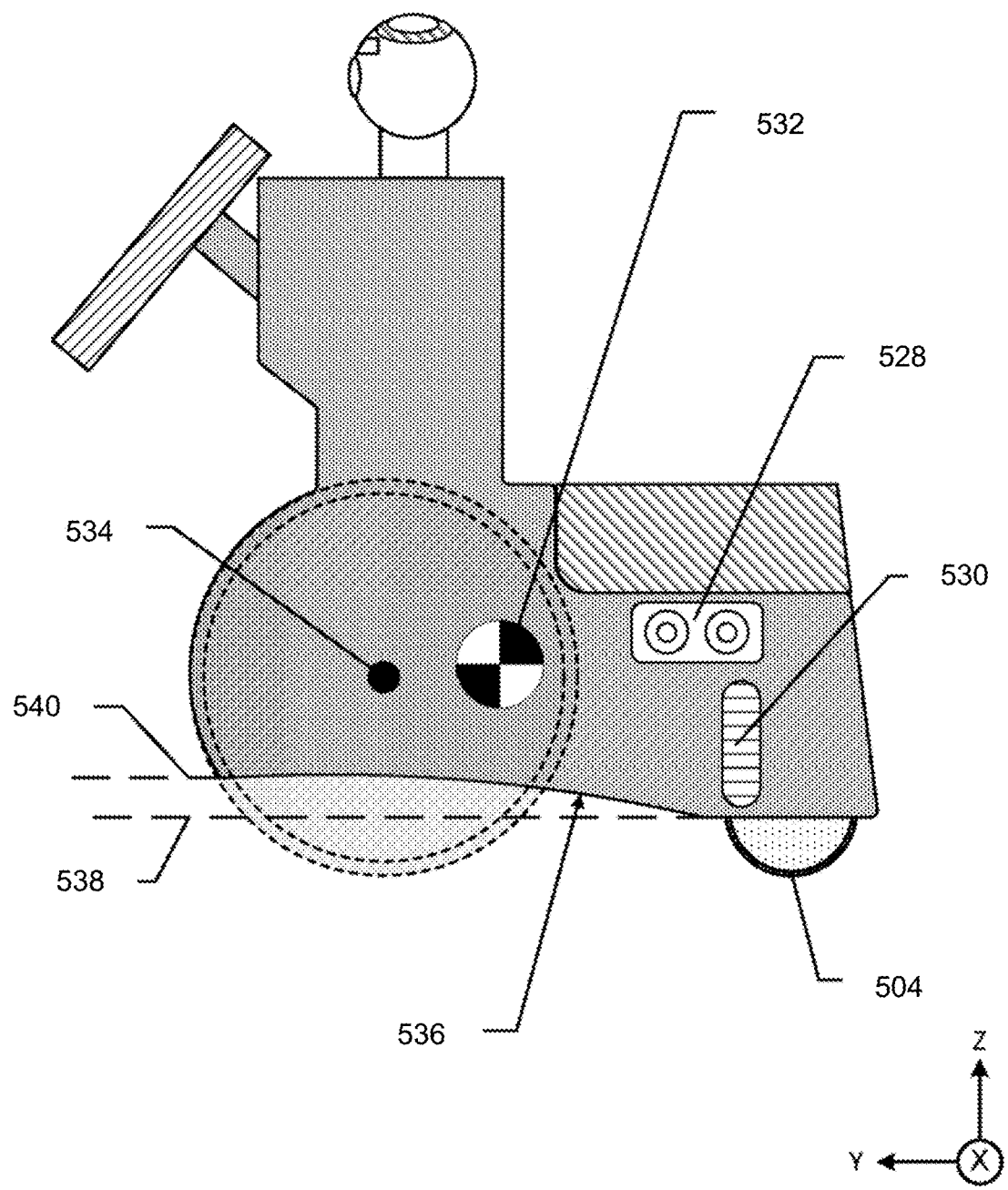
Figure 5C:
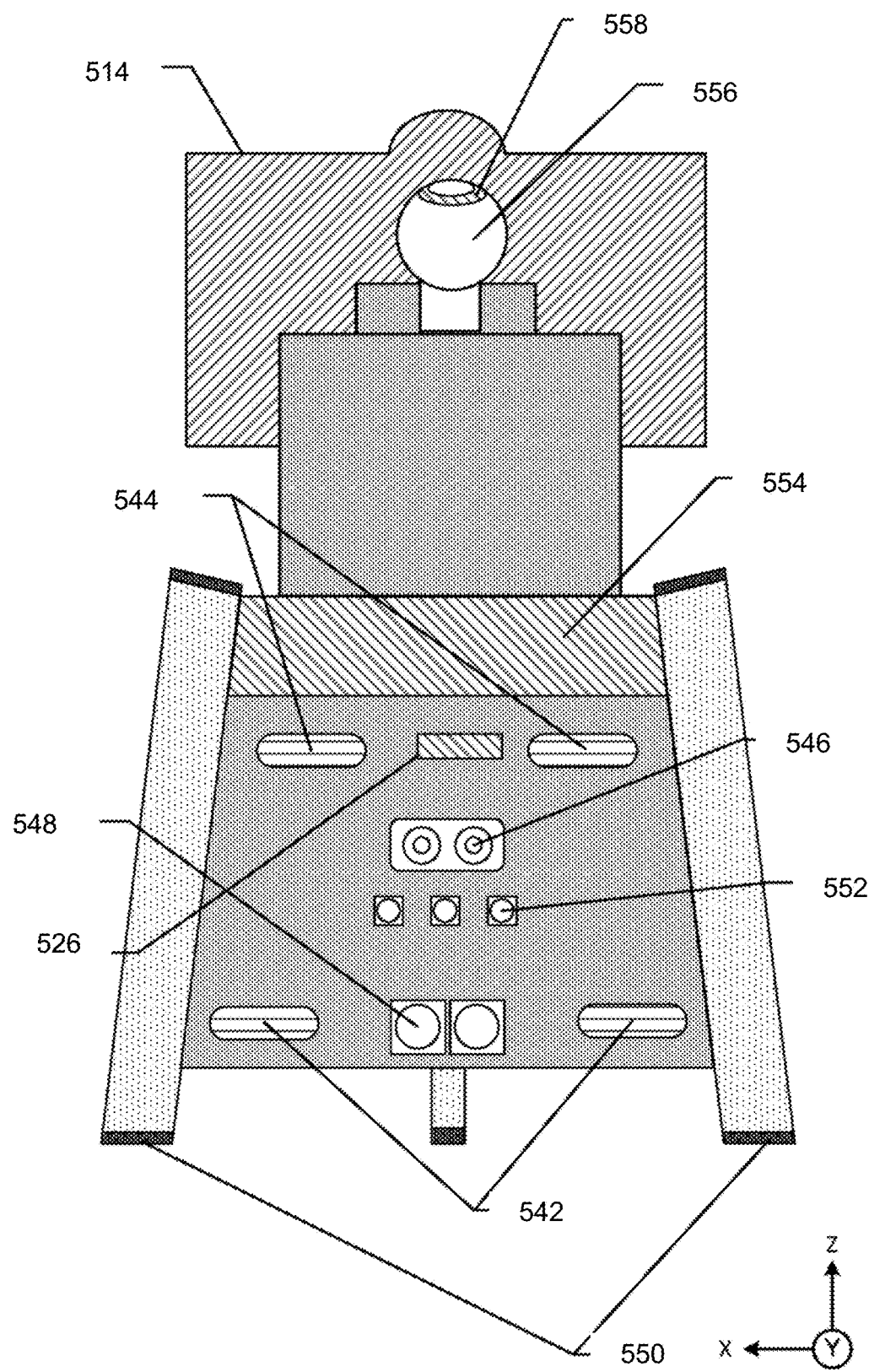

FIGS. 5A-5C illustrate one embodiment of an autonomously mobile device 110. FIG. 5A illustrates a front view of the autonomously mobile device 110 according to various embodiments of the present disclosure. The device 110 includes wheels 502 disposed on left and right sides of a lower structure. The wheels 502 may be canted inwards toward an upper structure. In other embodiments, however, the wheels 502 may be mounted vertically. A caster 504 (i.e., a smaller wheel) may disposed along a midline of the device 110. The front section of the device 110 may include a variety of external sensors. A first set of optical sensors 506 may be disposed along the lower portion of the front, and a second set of optical sensors 508 may be disposed along an upper portion of the front. A microphone array 510 may be disposed between or near the second set of optical sensors 508.

One or more cameras 512 may be mounted to the front of the device 110; two cameras 512 may be used to provide for stereo vision. The distance between two cameras 512 may be, for example, 5-15 centimeters (cm); in some embodiments, the distance is 10 cm. In some embodiments, the cameras 512 may exhibit a relatively wide horizontal field-of-view (HFOV). For example, the HFOV may be between 90° and 110°. A relatively wide FOV may provide for easier detection of moving objects, such as users or pets, which may be in the path of the device 110. Also, the relatively wide FOV may provide for the device 110 to more easily detect objects when rotating or turning.

Cameras 512 used for navigation may be of different resolution from, or sensitive to different wavelengths than, other cameras 512 used for other purposes, such as video communication. For example, navigation cameras 512 may be sensitive to infrared light allowing the device 110 to operate in darkness or semi-darkness, while a camera 516 mounted above a display 514 may be sensitive to visible light and may be used to generate images suitable for viewing by a person. A navigation camera 512 may have a resolution of at least 300 kilopixels each, while the camera 516 mounted above the display 514 may have a resolution of at least 10 megapixels. In other implementations, navigation may utilize a single camera 512.

The cameras 512 may operate to provide stereo images of the environment, the user, or other objects. For example, an image from the camera 516 disposed above the display 514 may be accessed and used to generate stereo-image data corresponding to a face of a user. This stereo-image data may then be used for facial recognition, user identification, gesture recognition, gaze tracking, and other uses. In some implementations, a single camera 516 may be disposed above the display 514.

The display 514 may be mounted on a movable mount. The movable mount may allow the display to move along one or more degrees of freedom. For example, the display 514 may tilt, pan, change elevation, and/or rotate. In some embodiments, the display 514 may be approximately 8 inches as measured diagonally from one corner to another.

An ultrasonic sensor 518 may be mounted on the front of the device 110 and may be used to provide sensor data that is indicative of objects in front of the device 110.

One or more speakers 520 may be mounted on the device 110, and the speakers 520 may have different audio properties. For example, low-range, mid-range, and/or high-range speakers 520 may be mounted on the front of the device 110. The speakers 520 may be used to provide audible output such as alerts, music, human speech such as during a communication session with another user, and so forth.

Other output devices 522, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical motion sensors (FOMS) 524, 526 may be disposed on the underside of the device 110. The FOMS 524, 526 may provide indication indicative of motion of the device 110 relative to the floor or other surface underneath the device 110. In some embodiments, the FOMS 524, 526 comprise a light source, such as light-emitting diode (LED) and/or an array of photodiodes. In some implementations, the FOMS 524, 526 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the FOMS 524, 526 may provide other information, such as data indicative of a pattern present on the floor, composition of the floor, color of the floor, and so forth. For example, the FOMS 524, 526 may utilize an optoelectronic sensor that may detect different colors or shades of gray, and this data may be used to generate floor characterization data.

FIG. 5B illustrates a side view of the autonomously mobile device 110 according to various embodiments of the present disclosure. In this side view, the left side of the device 110 is illustrated. An ultrasonic sensor 528 and an optical sensor 530 may be disposed on either side of the device 110.

The disposition of components of the device 110 may be arranged such that a center of gravity (COG) 532 is located between a wheel axle 534 of the front wheels 502 and the caster 504. Such placement of the COG 532 may result in improved stability of the device 110 and may also facilitate lifting by a carrying handle 128.

In this illustration, the caster 110 is shown in a trailing configuration, in which the caster 110 is located behind or aft of the wheel axle 534 and the center of gravity 532. In another implementation (not shown) the caster 110 may be in front of the axle of the wheels 502. For example, the caster 504 may be a leading caster 504 positioned forward of the center of gravity 532.

The device 110 may encounter a variety of different floor surfaces and transitions between different floor surfaces during the course of its operation. A contoured underbody 536 may transition from a first height 538 at the front of the device 110 to a second height 540 that is proximate to the caster 504. This curvature may provide a ramp effect such that, if the device 110 encounters an obstacle that is below the first height 538, the contoured underbody 536 helps direct the device 110 over the obstacle without lifting the driving wheels 502 from the floor.

FIG. 5C illustrates a rear view of the autonomously mobile device 110 according to various embodiments of the present disclosure. In this view, as with the front view, a first pair of optical sensors 542 are located along the lower edge of the rear of the device 110, while a second pair of optical sensors 544 are located along an upper portion of the rear of the device 110. An ultrasonic sensor 546 may provide proximity detection for objects that are behind the device 110.

Charging contacts 548 may be provided on the rear of the device 110. The charging contacts 548 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 502 may include an electrically conductive portion 550 and provide an electrical conductive pathway between the device 110 and a charging source disposed on the floor. One or more data contacts 552 may be arranged along the back of the device 110. The data contacts 552 may be configured to establish contact with corresponding base data contacts within the docking station. The data contacts 552 may provide optical, electrical, or other connections suitable for the transfer of data.

Other output devices 126, such as one or more lights, may be disposed on an exterior of the back of the device 110. For example, a brake light may be arranged on the back surface of the device 110 to provide users an indication that the device 110 is slowing or stopping.

The device 110 may include a modular payload bay 554. In some embodiments, the modular payload bay 554 is located within the lower structure. The modular payload bay 554 may provide mechanical and/or electrical connectivity with the device 110. For example, the modular payload bay 554 may include one or more engagement features such as slots, cams, ridges, magnets, bolts, and so forth that are used to mechanically secure an accessory within the modular payload bay 554. In some embodiments, the modular payload bay 554 includes walls within which the accessory may sit. In other embodiments, the modular payload bay 554 may include other mechanical engagement features such as slots into which the accessory may be slid and engage. The device 110 may further include a mast 556, which may include a light 558.

The machine-learning model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine-learning techniques, the machine-learning processes themselves need to be trained. Training a machine-learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A voice-controlled system may be configured to receive and process a call request from one device 110 and route that call request to communication servers 125 in order to establish an asynchronous call from one device 110 to another device 110 where the call may be placed and potentially answered using voice commands. Certain aspects of speech command processing may be handled by server(s) 120 while certain aspects of call routing and management may be handled by communication server(s) 125. Calls may be audio calls, video and audio calls, or other such combinations.

FIG. 6 illustrates an example of signaling to initiate a communication session according to examples of the present disclosure. In one example configuration, the server(s) 120 are configured to enable voice commands (e.g., perform ASR, NLU, etc. to identify a voice command included in audio data), whereas the communication server(s) 125 are configured to enable communication sessions (e.g., using session initiation protocol (SIP)). For example, the server(s) 125 may send SIP messages to endpoints (e.g., adapter, device 110, remote devices, etc.) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the server(s) 125 may send SIP messages to initiate a single RTP media stream between two endpoints (e.g., direct RTP media stream between two devices device 110) and/or to initiate and facilitate RTP media streams between the two endpoints (e.g., RTP media streams between devices 110 and the server(s) 125). During a communication session, the server(s) 125 may initiate multiple media streams, with a first media stream corresponding to incoming audio data from the device 110 to an adapter and a second media stream corresponding to outgoing audio data from an adapter to the device 110, although for ease of explanation this may be illustrated as a single RTP media stream.

As illustrated in FIG. 6, the device 110 may send (502) audio data to the server(s) 120 and the server(s) 120 may determine (504) call information using the audio data and may send (506) the call information to the server(s) 125. The server(s) 120 may determine the call information by performing ASR, NLU, etc., as discussed above with regard to FIG. 2, and the call information may include a data source name (DSN), a number from which to call, a number to which to call, encodings and/or additional information. For example, the server(s) 120 may identify from which phone number the user would like to initiate the telephone call, to which phone number the user would like to initiate the telephone call, from which device 110 the user would like to perform the telephone call, etc.

While FIG. 6 illustrates the server(s) 120 sending the call information to the server(s) 125 in a single step (e.g., 606), the disclosure is not limited thereto. Instead, the server(s) 120 may send the call information to the device 110 and the device 110 may send the call information to the server(s) 125 in order to initiate the telephone call without departing from the disclosure. Thus, the server(s) 120 may not communicate directly with the server(s) 125 in step 606, but may instead instruct the device 110 to connect to the server(s) 125 in order to initiate the telephone call.

The server(s) 125 may include an outbound SIP translator 632, an inbound SIP translator 634 and a call state database 640. The outbound SIP translator 632 may include logic to convert commands received from the server(s) 120 into SIP requests/responses and may handle sending outgoing SIP requests and sending responses to incoming SIP requests. After receiving the call information by the outbound SIP translator 632, the outbound SIP translator 632 may persist (508) a SIP dialog using the call state database 640. For example, the DSN may include information such as the name, location and driver associated with the call state database 640 (and, in some examples, a user identifier (ID) and password of the user) and the outbound SIP translator 632 may send a SIP dialog to the call state database 640 regarding the communication session. The call state database 640 may persist the call state if provided a device ID and one of a call ID or a dialog ID. The outbound SIP translator 632 may send (510) a SIP Invite to an Endpoint 650, a remote device, a Session Border Controller (SBC) or the like. In some examples, the endpoint 650 may be a SIP endpoint, although the disclosure is not limited thereto.

The inbound SIP translator 634 may include logic to convert SIP requests/responses into commands to send to the server(s) 120 and may handle receiving incoming SIP requests and incoming SIP responses. The endpoint 650 may send (512) a 100 TRYING message to the inbound SIP translator 634 and may send (514) a 180 RINGING message to the inbound SIP translator 634. The inbound SIP translator 634 may update (516) the SIP dialog using the call state database 640 and may send (518) a RINGING message to the server(s) 120, which may send (520) the RINGING message to the device 110.

When the communication session is accepted by the endpoint 650, the endpoint 650 may send (522) a 200 OK message to the inbound SIP translator 634, the inbound SIP translator 645 may send (524) a startSending message to the server(s) 120 and the server(s) 120 may send (526) the startSending message to the device 110. The startSending message may include information associated with an internet protocol (IP) address, a port, encoding or the like required to initiate the communication session. Using the startSending message, the device 110 may establish (528) an RTP communication session with the endpoint 650 via the server(s) 125.

While FIG. 6 illustrates the server(s) 125 sending the RINGING message and the StartSending message to the device 110 via the server(s) 120, the disclosure is not limited thereto. Instead, steps 618 and 620 may be combined into a single step and the server(s) 125 may send the RINGING message directly to the device 110 without departing from the disclosure. Similarly, steps 624 and 626 may be combined into a single step and the server(s) 125 may send the StartSending message directly to the device 110 without departing from the disclosure. Thus, the server(s) 125 may communicate with the device 110 directly without using the server(s) 120 as an intermediary.

For ease of explanation, the disclosure illustrates the system 100 using SIP. However, the disclosure is not limited thereto and the system 100 may use any communication protocol for signaling and/or controlling communication sessions without departing from the disclosure. Similarly, while some descriptions of the communication sessions refer only to audio data, the disclosure is not limited thereto and the communication sessions may include audio data, video data and/or any other multimedia data without departing from the disclosure.

Figure 7B:
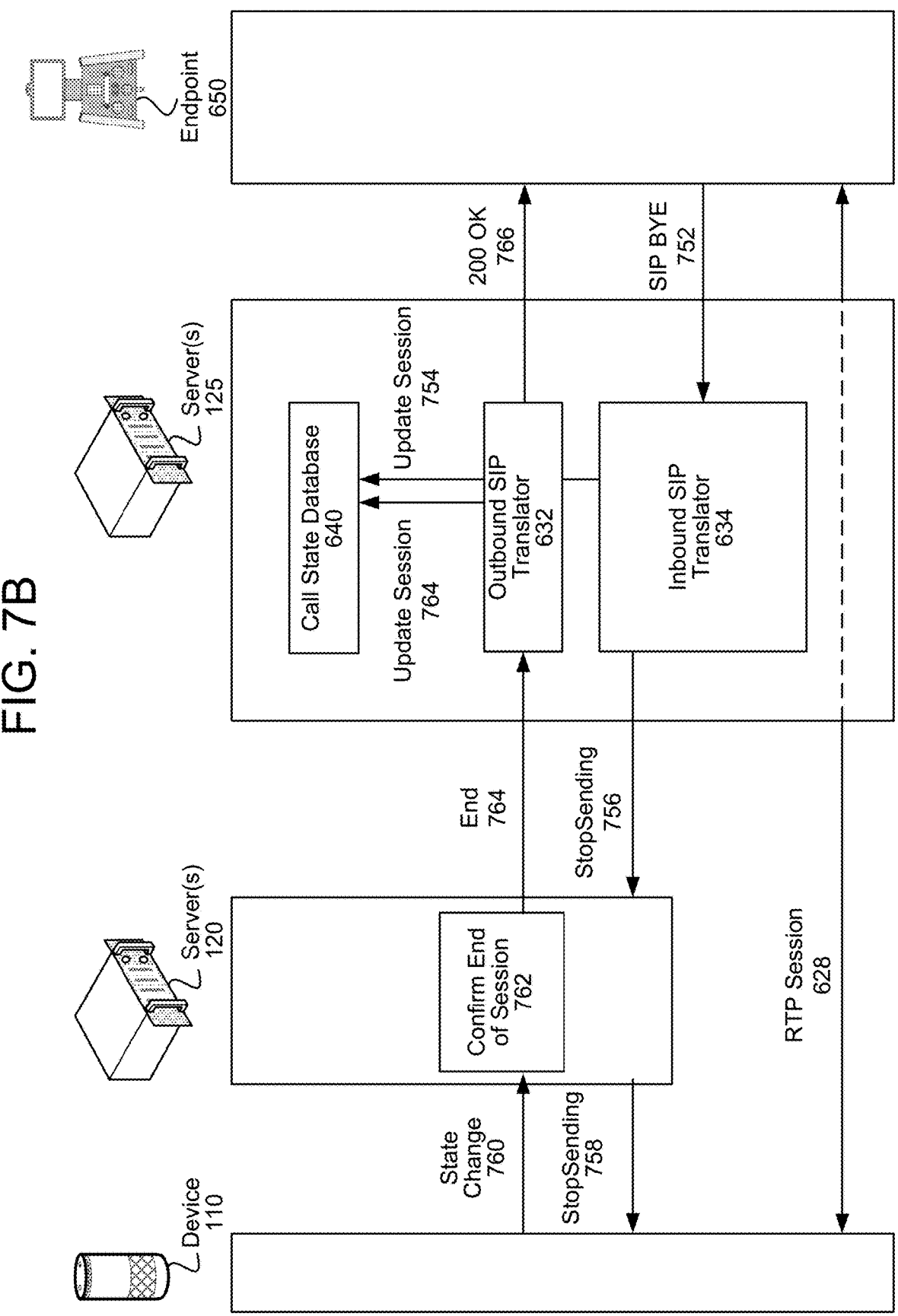

FIG. 7A-8B illustrate examples of signaling to end a communication session according to examples of the present disclosure. After establishing the RTP communication session 628 between the device 110 and the endpoint 650, the RTP communication session may be ended by the user inputting a command to end the telephone call to the device 110, as illustrated in FIG. 7A, or a remote party inputting a command to end the telephone call to the endpoint 650, as illustrated in FIG. 7B.

The device 110 may initiate the end of the communication session. As illustrated in FIG. 7A, the device 110 may send a state change message 702 to the server(s) 120, which may determine 704 that a user of the device 110 wishes to end the session. The server(s) 120 may correspondingly send an end message 706 to the server(s) 125. The outbound SIP translator 632 may, in response, update the session using the call state database 640 and may send a SIP BYE 708 message to the endpoint 650. The endpoint 650 may send a 200 OK message 710 to the inbound SIP translator 634 and the inbound SIP translator 634 may update the session using the call state database 640. In some examples, the inbound SIP translator 634 may send the 200 OK message 710 to the device 110 to confirm that the communication session has been ended. Thus, the RTP communication session 628 may be ended between the device 110 and the endpoint 650.

The endpoint 650 may instead or in addition initiate the end of the session. As illustrated in FIG. 7B, the endpoint 650 may send a SIP BYE message 752 to the inbound SIP translator 634 and the inbound SIP translator 634 may update the session using the call state database 640. The inbound SIP translator 634 may send a stopSending message 756 to the server(s) 120 and the server(s) 120 may send a corresponding stopSending message 758 to the device 110. The device 110 may send a state change message 760 to the server(s) 120 and the server(s) 120 may confirm 762 the end of the session and send an End message 764 to the outbound SIP translator 632; the End message 764 may include a DSN. The outbound SIP translator 632 may then update the session using the call state database 640, and send a 200 OK 766 message to the endpoint 650. Thus, the RTP communication session 628 may be ended between the device 110 and the endpoint 650.

While FIGS. 7A and 7B illustrate the server(s) 120 acting as an intermediary between the device 110 and the server(s) 125, the disclosure is not limited thereto. Instead, the device 110 may directly send the state change message(s) 702/760 and/or the End message(s) 706/764 to the server(s) 125 without departing from the disclosure. Similarly, the server(s) 125 may send the StopSending message 756 directly to the device 110 without departing from the disclosure, and/or the device 110 may directly send the state change message(s) 702/760 and/or the End message(s) 706/764 to the server(s) 125 without departing from the disclosure.

While FIGS. 6, 7A and 7B illustrate the RTP communication session 628 being established between the device 110 and the endpoint 650, the disclosure is not limited thereto and the RTP communication session 628 may be established between an adapter (such as an adapter to a packet switched telephone network, not shown).

Figure 8A:
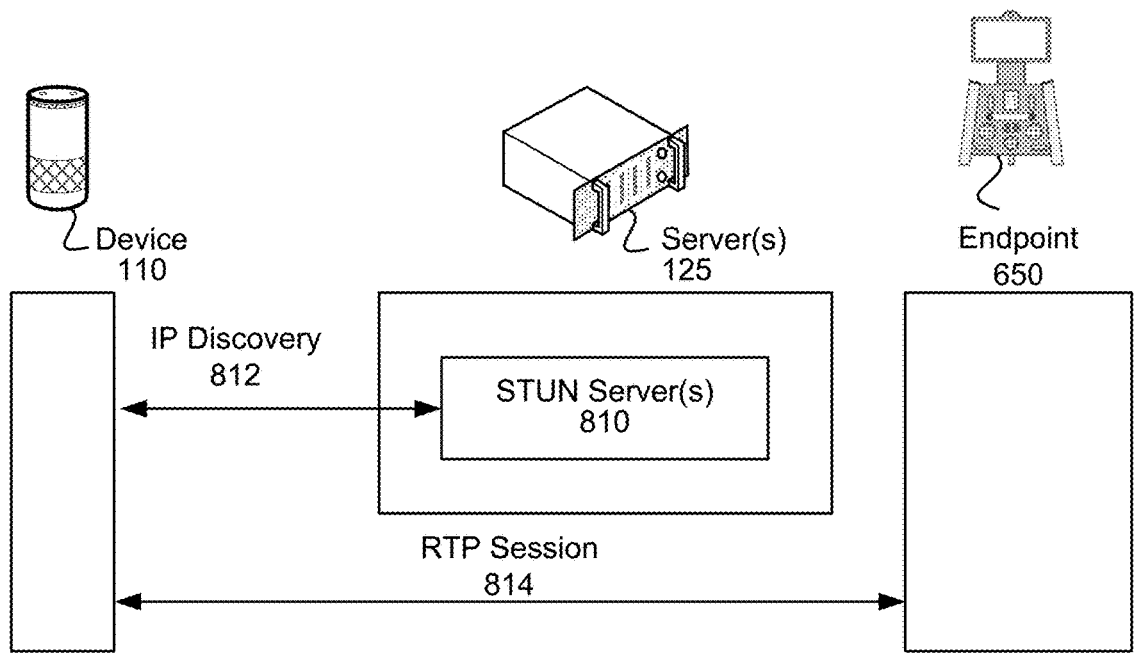
FIGS. 8A-8B illustrate examples of establishing communication sessions between devices according to examples of the present disclosure.
Figure 8B:
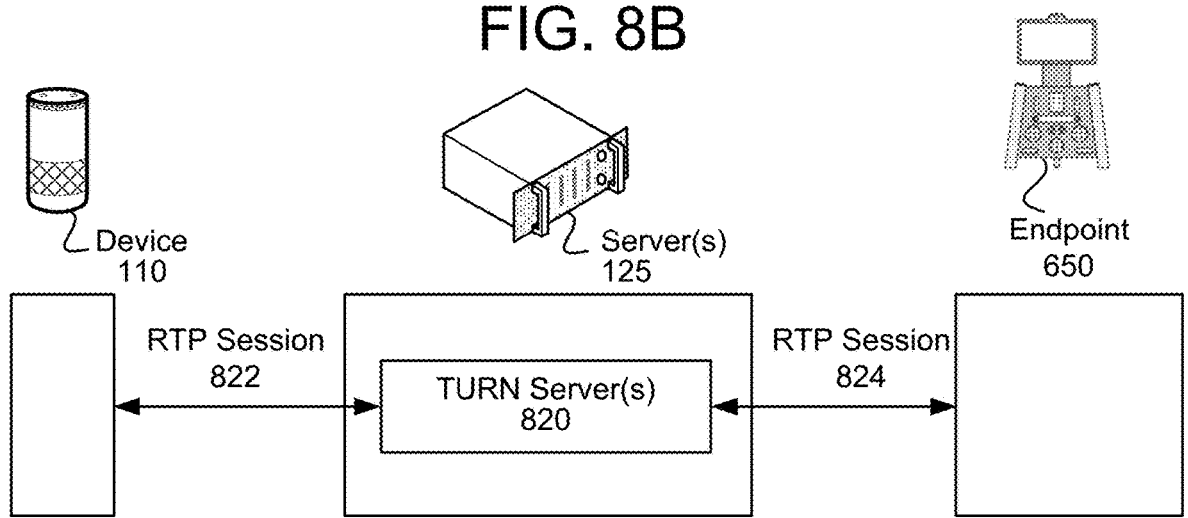

FIG. 8A-8B illustrate examples of establishing communication sessions and/or media streams between devices according to examples of the present disclosure. In some examples, the device 110 may have a publicly accessible IP address and may be configured to establish the RTP communication session directly with the endpoint 650. To enable the device 110 to establish the RTP communication session, the server(s) 125 may include Session Traversal of User Datagram Protocol (UDP) Through Network Address Translators (NATs) server(s) (e.g., STUN server(s) 810). The STUN server(s) 810 may be configured to allow NAT clients (e.g., device 110 behind a firewall) to setup telephone calls to a VoIP provider hosted outside of the local network by providing a public IP address, the type of NAT they are behind and a port identifier associated by the NAT with a particular local port. With reference to FIG. 8A, the device 110 may perform IP discovery using the STUN server(s) 810 and may use this information to set up an RTP communication 814 (e.g., UDP communication) between the device 110 and the endpoint 650 to establish a telephone call.

In some examples, the device 110 may not have a publicly accessible IP address. For example, in some types of NAT the device 110 cannot route outside of the local network. To enable the device 110 to establish an RTP communication session, the server(s) 125 may include Traversal Using relays around NAT (TURN) server(s) 820. The TURN server(s) 820 may be configured to connect the device 110 to the endpoint 650 when the client 110 is behind a NAT. With reference to FIG. 8B, the device 110 may establish an RTP session with the TURN server(s) 820 and the TURN server(s) 820 may establish an RTP session with the endpoint 650. Thus, the device 110 may communicate with the endpoint 650 via the TURN server(s) 820. For example, the device 110 may send outgoing audio data to the server(s) 125 and the server(s) 125 may send the outgoing audio data to the endpoint 650. Similarly, the endpoint 650 may send incoming audio data to the server(s) 125 and the server(s) 125 may send the incoming audio data to the device 110.

In some examples, the system 100 may establish communication sessions using a combination of the STUN server(s) 810 and the TURN server(s) 820. For example, a communication session may be more easily established/configured using the TURN server(s) 820, but may benefit from latency improvements using the STUN server(s) 810. Thus, the system 100 may use the STUN server(s) 810 when the communication session may be routed directly between two devices and may use the TURN server(s) 820 for all other communication sessions. Additionally or alternatively, the system 100 may use the STUN server(s) 810 and/or the TURN server(s) 820 selectively based on the communication session being established. For example, the system 100 may use the STUN server(s) 810 when establishing a communication session between two devices (e.g., point to point) within a single network (e.g., corporate LAN and/or WLAN), but may use the TURN server(s) 820 when establishing a communication session between two devices on separate networks and/or three or more devices regardless of network(s). When the communication session goes from only two devices to three or more devices, the system 100 may need to transition from the STUN server(s) 810 to the TURN server(s) 820. Thus, the system 100 may anticipate three or more devices being included in the communication session and may establish the communication session using the TURN server(s) 820.

FIGS. 9A-9D describe various embodiments of the present disclosure. Referring first to FIG. 9A, in various embodiments, a calling device (here, a smart speaker 110c) requests that a communications connection be established with a receiving device (here, an autonomously mobile device 110a). The calling device 110c receives (902) audio corresponding to an utterance by a first user and may detect a wakeword in the utterance. The utterance may include the request to create the communication connection and may further include information regarding the receiving device 110a, such as the name, type, or address of the receiving device 110a and/or the name, nickname, or address of a second user of the receiving device 110a. The calling device 110c generates audio data corresponding to the audio and sends (904) the audio data to server(s) 120 (in some embodiments, based on detecting the wakeword).

The server(s) 120 may perform (906) speech processing on the audio data, as described above, to determine that the utterance corresponds to the call request to establish a communication connection with the receiving device 110a. The server(s) 120 may further determine that the audio data includes the name, type, or address of the receiving device 110a and/or the name, nickname, or address of a second user of the receiving device 110a. Based on the speech processing, the server(s) 120 may identify (908) the second user as the recipient of the call request. As described in greater detail below, the server(s) 120 may make further determinations, such as whether the first user requires authorization from the second user before establishing the communication connect (as specified in a user profile associated with the second user, as described above), if the receiving device 110a is an autonomously mobile device, or similar determinations.

The server(s) 120 may thereafter send (910) a call request to communication server(s) 125. If the receiving device 110a is not an autonomously mobile device, the communication server(s) may simply send an indication (911) to the receiving device 110a to ring or otherwise indicate that a call is incoming. If the receiving device 110a is an autonomously mobile device, however, the server(s) 125 may send commands, such as the API commands described above, to the receiving device 110a to locate and/or find (914) the second user. If the receiving device locates and/or finds the second user, it may request (916) permission from the second user to open the call (using, for example, an audio or touchscreen interface). If the receiving device receives (918) such permission (using, for the example, the audio or touchscreen interface), it may send (920) an indication of finding the user and an indication that the call was accepted to the server(s) 125. In response, the server(s) 125 may send a first start-call instruction 922a to the calling device 110c and a second start-call instruction 922b to the receiving device 110a, which may then create an ongoing call 924 over the communication connection.

FIG. 9B, like FIG. 9A described above, illustrates creating a communication connection in accordance with embodiments of the present disclosure; in these embodiments, however, the first user of the calling device 110c is authorized to create the communication connect without requesting permission from the second user.

As above, the calling device 110c requests that a communications connection be established with a receiving device 110a. The calling device 110c receives (902) audio corresponding to an utterance by a first user and may detect a wakeword in the utterance. The utterance may include the request to create the communication connection and may further include information regarding the receiving device 110a, such as the name, type, or address of the receiving device 110a and/or the name, nickname, or address of a second user of the receiving device 110a. The calling device 110c generates audio data corresponding to the audio and sends (904) the audio data to server(s) 120 (in some embodiments, based on detecting the wakeword).

The server(s) 120 may perform (906) speech processing on the audio data, as described above, to determine that the utterance corresponds to the call request to establish a communication connection with the receiving device 110a. The server(s) 120 may further determine that the audio data includes the name, type, or address of the receiving device 110a and/or the name, nickname, or address of a second user of the receiving device 110a. Based on the speech processing, the server(s) 120 may identify (908) the second user as the recipient of the call request.

In these embodiments, the server(s) 120 determine (926) that the calling device 110c is authorized to start the call (without, for example, additional authorization from the second user). As explained above, the server(s) 120 may identify a user account associated with the second user and determine that the user account includes authorization for the first user to start the call. The server(s) 120 may therefore send (910) a call request, which may also indicate that said authorization is granted, to the server(s) 125, which may send an indication (911) and a corresponding request (912) to the receiving device 110a. The receiving device 110a may thereafter initiate (914) the user locate and/or find operation and, if the user is located and/or found, send (928) a corresponding indication to the server(s) 125. In response, the server(s) 125 may send a first start-call instruction 922a to the calling device 110c and a second start-call instruction 922b to the receiving device 110a, which may then create an ongoing call 924 over the communication connection.

FIG. 9C illustrates further embodiments of the present disclosure. In these embodiments, the first user may control movement of the receiving device 110a (e.g., movement in an environment, pan/tilt of a camera of the receiving device 110a, or other such movement). In various embodiments, for example, the first user is a doctor, therapist, or other caregiver, and may wish to move the receiving device 110a to better check in on the second user, who may have difficulty moving or may be prone to falling, bouts of unconsciousness, or other affectations that may affect his or her ability to respond to a call. In other embodiments, the first user is the owner of the receiving device 110a and wishes to operate it remotely to, for example, check in on a status of a small child, pet, or residence. As described above, the second user may authorize the first user to do so.

An ongoing call 924 is established as described above. The calling device 110c receives (930) movement input from the first user. If the calling device 110c is a smart speaker, as illustrated, the movement input may be voice input, such as "pan right" or "move forward." If the calling device is, for example, a smartphone 110b, the movement input may be touch input. The calling device 110c sends (932) movement data corresponding to the movement input to the server(s) 120.

The server(s) 120 may determine (934) that the calling device 110c is authorized to move the receiving device 110a. As described above, a user profile may be associated with the receiving device 110a, and the user profile may include authorization for the first user of the calling device 110c to move the receiving device 110a. In other embodiments (not illustrated), the server(s) 120 send a request to the receiving device 110a to authorization for the first user to move the receiving device 110a, and the second user of the receiving device 110a may send said authorization back to the server(s) 120.

The server(s) 120 may send (934) a movement request to the server(s) 125 and/or directly to the receiving device 110a; the server(s) 125 may send (938) the movement request to the receiving device 110a, if necessary. The receiving device 110a may move (940) in accordance with the movement request.

FIG. 9D illustrates embodiments of the present disclosure in which the autonomously mobile device is the calling device 110a may be used to initiate communications with a user of a receiving device 110c. For example, the first user may wish to communicate with the receiving device 110c and may know that the receiving device 110c is located in the same environment as the calling device 110a, but the first user may not be able to move to the second user. The calling device 110a may be used to find the second user; thereafter, the calling device 110a may output audio asking the second user to contact the first user or may send a request to communicate with the second device.

The calling device 110a receives (950) a request to call the second device (via, as described above, voice, touch, or other input) and sends (952) request data corresponding to the request to the server(s) 120. The server(s) 120 may determine (954) that the calling device 954 is authorized to call the third device and, if so, send a call request (910) to the server(s) 125 and/or directly to the sending device 110a. The sending device 110a initiates (960) a locate and/or a find operation to locate and/or find the receiving device and/or second user. Once the second user and/or receiving device is found, the sending device 110a may output audio corresponding to a request for the third user to establish communication with the calling device 110a. Alternatively or in addition, the receiving device 110 may send an indication of finding the third device to the server(s) 125, which may then initiate communication between the third device and the calling device 110c.

As illustrated in FIG. 9E, in various embodiments, the receiving device 110a may track (964) movement of the second user to maintain the second user in an area of observation if and when the second user moves in the environment while participating in a video, audio, or other call. The receiving device 110a may determine a location of the second user by one or more of the techniques described above (e.g., by analyzing video and/or audio data). Based on the location, the receiving device 110a may configure an input device (e.g., a video camera or microphone array) to receive input from the location. The area of observation of a camera may correspond to objects, scenes, or other environmental elements in the field of view of the camera; the area of observation of a microphone array may correspond to a direction in which the microphone array amplifies received audio (e.g., a beamforming direction). For example, the receiving device 110a may pan or tilt the camera to face the location or may configure the microphone array such that a target beam corresponds to the location. If the receiving device 110a determines that the second user has moved from a first location to a second location (by, e.g., determining movement of the user), the receiving device 110 configures the input device to receive input from the second location. Data from one input device may be used to configure a position of a second input device. For example, if data from the microphone array indicates that a source of audio lies in a particular direction, the device 110a may rotate or otherwise move a camera to point in that direction; the camera may then be used to collect data for facial recognition. In another example, if data from the camera indicates that a face lies in a particular direction, the device 110a may configure the microphone array to amplify sounds from that direction. If an input device does not detect a user at a particular location, the device 110a may search for the user at other locations.

In some embodiments, the second user may wish that the receiving device 110a not capture the second user on video during a video call or similar communication. In these embodiments, the second user may issue an utterance expressing this wish (e.g., "stop looking at me"). The receiving device 110a may determine that the utterance corresponds to a request to stop the video (and/or may send audio data corresponding to the utterance to the server(s) 120, which may instead or in addition determine that the utterance corresponds to the request to stop the video). Based on the determination, the receiving device 110a may cease capturing video or may pan/tilt its video camera such that the video does not include the second user.

In other embodiments, the second user may first receive the call from the first user on another device, such as a second smart speaker. The server(s) 120 may determine that a communication connection exists between the sending device 110c and the second smart speaker and determine a location at which the second smart speaker is disposed. The server(s) 120 may thus send a command to the receiving device 110a to move to the location of the second smart speaker, after which time the receiving device 110a to establish its own communication connection with the sending device 110c.

In some embodiments, the receiving device 110a may track the user by keeping the user in a field of observation. In some embodiments, the user grants authorization to start or continue the call by interacting with the receiving device 110a; in these embodiments, the receiving device 110a may track the user based on the interaction. In other embodiments, the receiving device 110a starts or continues the call based on a property of the user, such as a level of interaction between the user and the receiving device 110a.

In some embodiments, more than one user (i.e., the second user and another, third user) may be proximate the receiving device 110a. The receiving device 110a and/or the servers 120 may initially select the second user as the recipient of the call, but the third user may have been the intended recipient. If the receiving device 110a and/or the server(s) 120 determine that the third user is interacting with the receiving device 110a (i.e., facing it and/or speaking to it) and if the second user is not interacting with the receiving device 110a, the receiving device 110a may configure an input device (e.g., a video camera or microphone array) to receive input corresponding to the third user.

Figure 10:
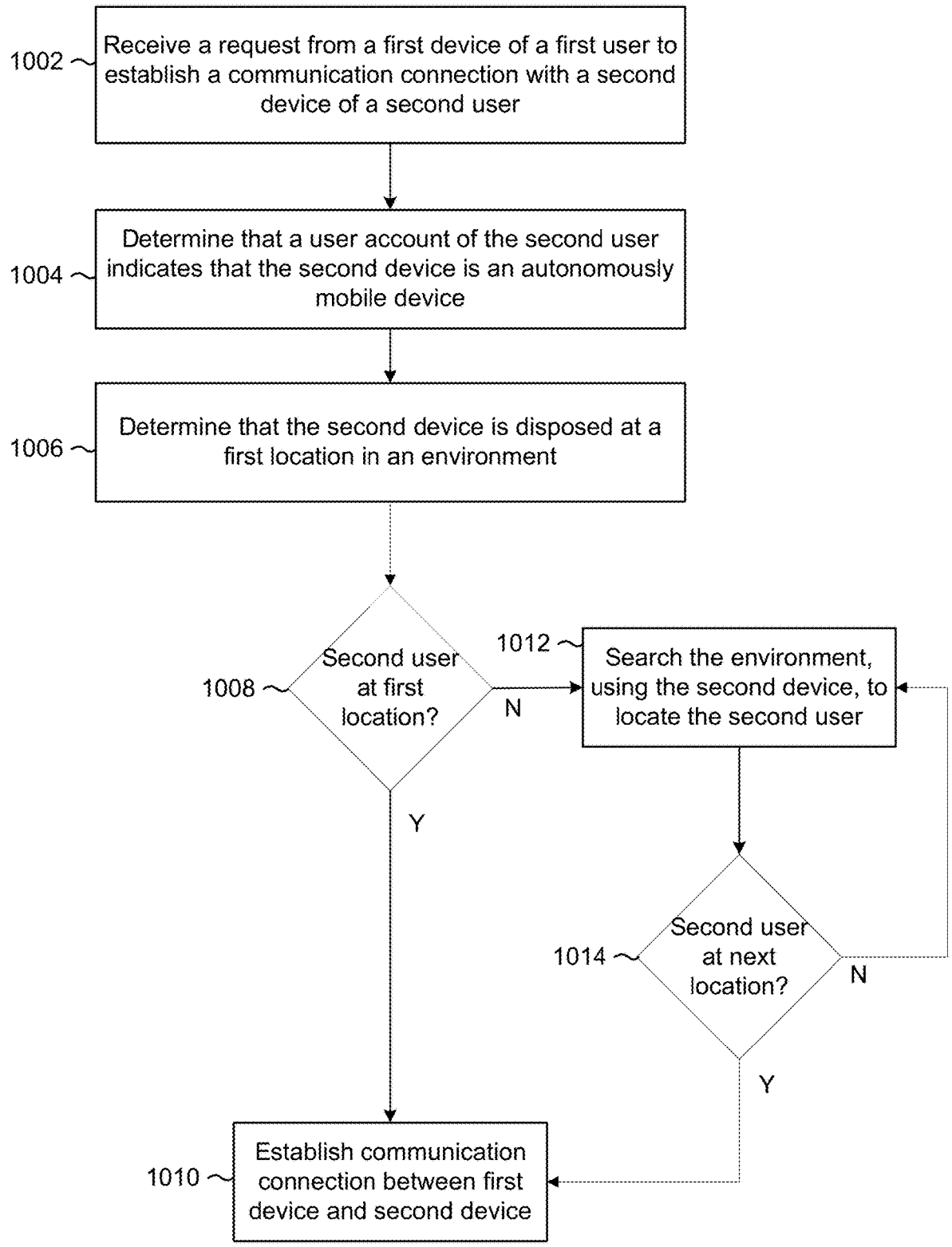
FIG. 10 illustrates a flow diagram illustrating searching for a user according to embodiments of the present disclosure.

FIG. 10 is a flow diagram of a process to provide communication, according to embodiments of the present invention. The process may be implemented at least in part by one or more of the device(s) 110 and/or the servers 120, 125.

The server(s) 120 receives (1002) a request from, for example, the first device 110b to establish a communication connection with a second device 110a. The request may include, for example, a communication type, such as a video communication and/or audio communication, and information identifying the second device 110a and/or the second user, such as a device name, device address, user name, and/or user address.

The server(s) 120 determines (1004) that a user account of the second user indicates that the second device 110c is an autonomously mobile device. The user account may indicate, for example, a device type, device name, or device properties of the second device 110a that indicates that the second device 110a is autonomously mobile device. The information in the user account may be provided by the first user or second user or determined from the second device 110a.

The server(s) 120 determines (1006) that the second device 110a is disposed in a first location in an environment, such as a house, room, yard, or other such environment. For example, the server(s) 120 may send a query to the second device 110a requesting its location; the second device 110a may, in response determine its location using, for example, sensor data, video data, network data, or other such data, and may send its location to the server(s) 120.

The server(s) 120 may determine (1008) that the second user is disposed at the first location. The server(s) 120 may, for example, send a query to the second device 110a to monitor the first location to determine if the user is present using, for example, a camera and/or microphone. The second device 110a may send audio and/or video data to the server(s) 120, and the server(s) 120 may determine that the second user is present at the first location. In other embodiments, the second device 110a determines that the second user is present at the first location.

If the second user is present at the first location, the communication server 125 may establish (1010) a communication connection between the first device and the second device, as described above. The communication server 125 may instruct the second device 110a to ask the second user whether they would like to accept the incoming call; in other embodiments, the first user is authorized to establish the communication connection without the second device 110a asking the second user.

If, however, the server(s) 120 and/or second device 110a determines that the second user is not at the first location, the second device 110a searches the environment to locate the second user. For example, the second device 110a may move to a different room or different area in an effort to locate the second user. If the server(s) 120 and/or second device 110a determines (1014) that the second user is at a next location, the communication server 125 establishes the communication connect as described above. If not, the second device continues searching (1012).

Figure 11:
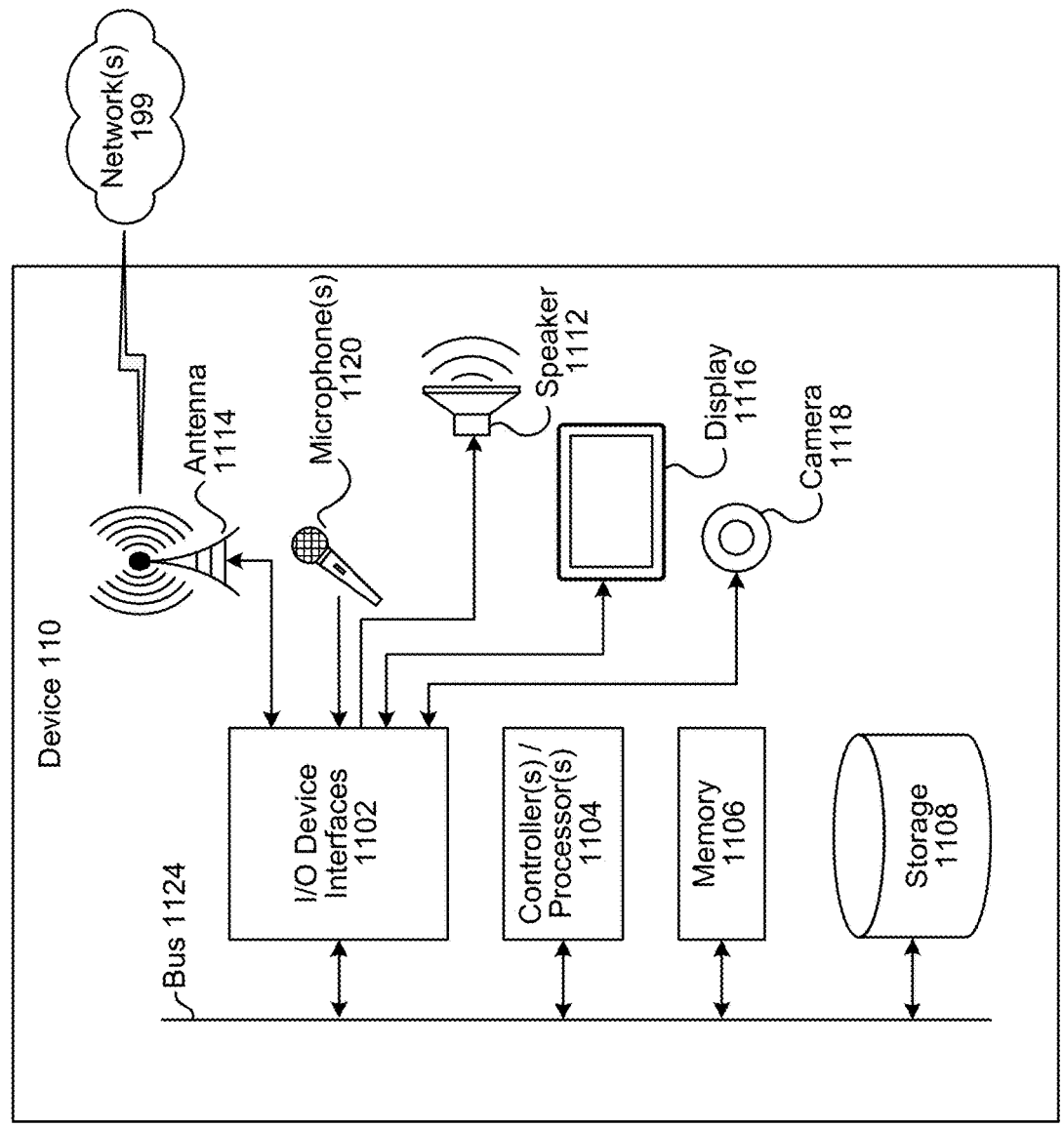
FIG. 11 is a block diagram conceptually illustrating example components of a device according to embodiments of the present disclosure.
Figure 12:
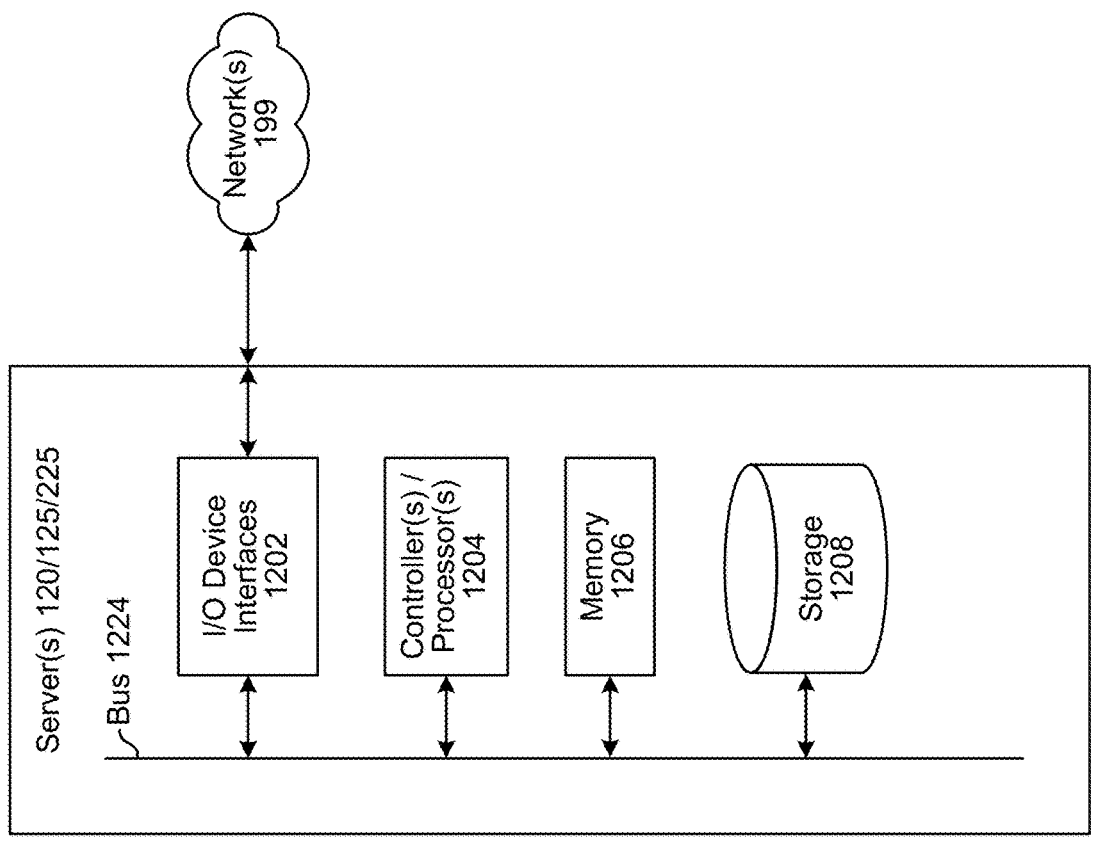
FIG. 12 is a block diagram conceptually illustrating example components of a server according to embodiments of the present disclosure.

FIG. 11 is a block diagram conceptually illustrating a device 110 that may be used with the system. FIG. 12 is a block diagram conceptually illustrating example components of a remote device, such as the server(s) 120, which may assist with ASR processing, NLU processing, etc., and the skill server(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/125/225) may be included in the system, such as one or more servers 120 for performing ASR processing, one or more servers 120 for performing NLU processing, one or more server(s) 125 for routing and managing communications, one or more skill server(s) 225 for performing actions responsive to user inputs, etc. In operation, each of these devices (or groups of devices) may include computer-readable and computer-executable instructions that reside on the respective device (120/125/225), as will be discussed further below.

Each of these devices (110/120/125/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125/225) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125/225) may also be connected to removable or external non-volatile memory and/or storage (such as a removable memory card, memory key drive, networked storage, etc.) through respective input/output device interfaces (1102/1202).

Computer instructions for operating each device (110/120/125/225) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125/225) includes input/output device interfaces (1102/1202). A variety of components may be connected through the input/output device interfaces (1102/1202), as will be discussed further below. Additionally, each device (110/120/125/225) may include an address/data bus (1124/1224) for conveying data among components of the respective device. Each component within a device (110/120/125/225) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G twork, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the server(s) 120, or the skill server(s) 225 may include their own dedicated processors, memory, and/or storage. Alternatively, one or more of the components of the device(s) 110, the server(s) 120, or the skill server(s) 225 may utilize the I/O interfaces (1102/1202), processor(s) (1104/1204), memory (1106/1206), and/or storage (1108/1208) of the device(s) 110 server(s) 120, or the skill server(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the communication server(s) 25, as described herein, are illustrative, and may be located as a stand-alone device or may be included, in whole or in part, as a component of a larger device or system.

Figure 13:
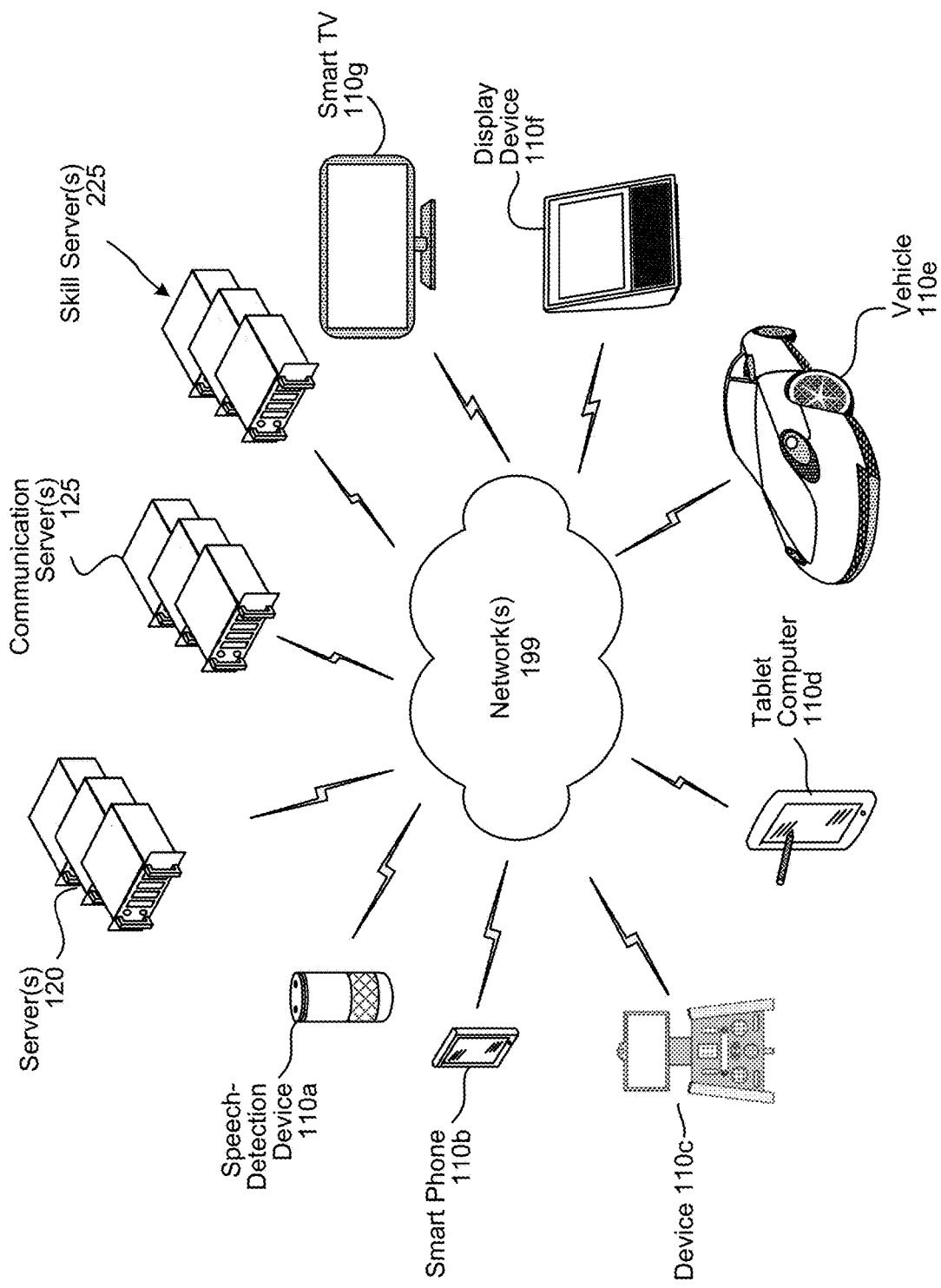
FIG. 13 illustrates an example of a computer network for use with the speech processing system.

As illustrated in FIG. 13, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, an autonomously mobile device 110a, a smartphone 110b, a voice-controlled device 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the skill server(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first input data corresponding to a communication request and a first user identifier;
   moving, by an autonomously mobile device, from a first location to a second location;
   detecting, by the autonomously mobile device at the second location, presence of a first person;
   determining that the first person corresponds to the first user identifier;
   receiving second input data corresponding to a user input from the first person; and
   in response to the second input data, establishing a communication connection between the autonomously mobile device and a second device.

2. The computer-implemented method of claim 1, further comprising:
   during the communication connection, receiving, by the autonomously mobile device, a command to move a component of the autonomously mobile device, the command originating from the second device; and
   in response to the command, moving, by the autonomously mobile device, the component.

3. The computer-implemented method of claim 1, further comprising, after determining that the first person corresponds to the first user identifier but prior to establishing the communication connection:
   presenting, by the autonomously mobile device, a message corresponding to the communication request; and
   determining that the second input data corresponds to an affirmative response to the message.

4. The computer-implemented method of claim 1, further comprising, prior to establishing the communication connection:
   sending, to a remote device, an indication that a user corresponding to the first user identifier has been located.

5. The computer-implemented method of claim 1, wherein determining, by the autonomously mobile device that the first person corresponds to the first user identifier comprises:
processing, by the autonomously mobile device, image data captured by a camera of the autonomously mobile device to determine that the first person corresponds to the first user identifier.

6. The computer-implemented method of claim 1, wherein determining, by the autonomously mobile device that the first person corresponds to the first user identifier comprises:
processing, by the autonomously mobile device, audio data captured by a microphone of the autonomously mobile device to determine that the first person corresponds to the first user identifier.

7. The computer-implemented method of claim 1, further comprising:
during the communication connection, determining, by the autonomously mobile device, that the first person is moving; and
moving the autonomously mobile device from the second location to a third location in response to movement by the first person.

8. The computer-implemented method of claim 1, wherein the second input data is received prior to the first input data and the second input data comprises authorization to begin a communication session between the autonomously mobile device and a device of a designated user.

9. The computer-implemented method of claim 1, further comprising:
determining, by the autonomously mobile device at the second location, presence of a second person; and
adjusting, by the autonomously mobile device, a position of a camera to avoid capturing an image of the second person.

10. The computer-implemented method of claim 1, further comprising, prior to the autonomously mobile device moving from the first location to the second location:
determining, by the autonomously mobile device at the first location, that a user corresponding to the first user identifier is not detectable.

11. A system, comprising:
at least one camera;
at least one microphone;
at least one processor; and
at least one memory comprising instructions that, when executed by the at least one processor, cause the system to:
receive first input data corresponding to a communication request and a first user identifier;
move an autonomously mobile device from a first location to a second location;
detect, by the autonomously mobile device at the second location, presence of a first person;
determine that the first person corresponds to the first user identifier;
receive second input data corresponding to a user input from the first person; and
in response to the second input data, establish a communication connection with a second device.

12. The system of claim 11, wherein the at least one memory further comprises instructions that, when executed by the at least one processor, further cause the system to:
during the communication connection, receive, by the autonomously mobile device, a command to move a component of the autonomously mobile device, the command originating from the second device; and
in response to the command, moving, by the autonomously mobile device, the component.

13. The system of claim 11, wherein the at least one memory further comprises instructions that, when executed by the at least one processor, further cause the system to, after determination that the first person corresponds to the first user identifier but prior to establishing the communication connection:
present, by the autonomously mobile device, a message corresponding to the communication request; and
determine that the second input data corresponds to an affirmative response to the message.

14. The system of claim 11, wherein the at least one memory further comprises instructions that, when executed by the at least one processor, further cause the system to, prior to establishing the communication connection:
send, to a remote device, an indication that a user corresponding to the first user identifier has been located.

15. The system of claim 11, wherein the instructions that cause the autonomously mobile device to determine that the first person corresponds to the first user identifier comprise instructions that, when executed by the at least one processor, cause the system to:
process, by the autonomously mobile device, image data captured by the at least one camera to determine that the first person corresponds to the first user identifier.

16. The system of claim 11, wherein the instructions that cause the autonomously mobile device to determine that the first person corresponds to the first user identifier comprise instructions that, when executed by the at least one processor, cause system to:
process, by the autonomously mobile device, audio data captured by the at least one microphone to determine that the first person corresponds to the first user identifier.

17. The system of claim 11, wherein the at least one memory further comprises instructions that, when executed by the at least one processor, further cause the system to:
during the communication connection, determine, by the autonomously mobile device, that the first person is moving; and
move the autonomously mobile device from the second location to a third location in response to movement by the first person.

18. The system of claim 11, wherein the second input data is received prior to the first input data and the second input data comprises authorization to begin a communication session between the autonomously mobile device and a device of a designated user.

19. The system of claim 11, wherein the at least one memory further comprises instructions that, when executed by the at least one processor, further cause the system to:
determine, by the autonomously mobile device, presence of a second person; and
adjust, by the autonomously mobile device, a position of a camera to avoid capturing an image of the second person.

20. The system of claim 11, wherein the at least one memory further comprises instructions that, when executed by the at least one processor, further cause the system to, prior to moving from the first location to the second location:
determine, by the autonomously mobile device, that a user corresponding to the first user identifier is not detectable.

* * * * *